(12) United States Patent
Christensen et al.

(10) Patent No.: US 6,856,236 B2
(45) Date of Patent: Feb. 15, 2005

(54) RF HOME AUTOMATION SYSTEM COMPRISING NODES WITH DUAL FUNCTIONALITY

(75) Inventors: Carlos Mélia Christensen, Copenhagen (DK); Jesper Knudsen, Elsinore (DK)

(73) Assignee: Ensys A/S, Copenhagen (DK)

( * ) Notice: Subject to any disclaimer, the term of this patent is extended or adjusted under 35 U.S.C. 154(b) by 483 days.

(21) Appl. No.: 09/841,050

(22) Filed: Apr. 25, 2001

(65) Prior Publication Data

US 2002/0044042 A1 Apr. 18, 2002

Related U.S. Application Data

(63) Continuation-in-part of application No. 09/547,055, filed on Apr. 10, 2000, now abandoned.

(51) Int. Cl.[7] .................... G05B 23/02; G05B 23/00; G05B 19/02; H02J 3/00
(52) U.S. Cl. .................... 340/3.5; 340/3.1; 340/3.7; 340/3.71; 340/5.1; 340/825.22; 340/825.24; 307/31; 307/38
(58) Field of Search .................... 340/3.5, 3.1, 3.7, 340/3.71, 5.1, 825.22, 825.24, 310.1, 3.54; 307/31, 38

(56) References Cited

U.S. PATENT DOCUMENTS

| | | | |
|---|---|---|---|
| 4,250,489 A | 2/1981 | Dudash et al. | |
| 4,427,968 A | 1/1984 | York | |
| 4,626,848 A | 12/1986 | Ehlers | |

(List continued on next page.)

FOREIGN PATENT DOCUMENTS

| | | | |
|---|---|---|---|
| DE | 40 15 457 A1 | 11/1991 | |
| EP | 0 395 495 A1 | 10/1990 | |
| EP | 0 782 117 A1 | 7/1997 | |
| EP | 0923060 A2 | 6/1999 | |
| EP | 1 113 622 A2 | 7/2001 | |
| GB | 2 244 576 A | 12/1991 | |
| GB | 2344675 A | 6/2000 | |
| JP | 08293886 A | 11/1996 | |
| WO | WO 95/01030 | 1/1995 | |
| WO | WO 97/32419 | 9/1997 | |
| WO | WO 00/50971 | 8/2000 | |

OTHER PUBLICATIONS

"Crestron Residential Products: Crestron SmarTouch™ STS Expansion Modules," http://www.crestron.com/products/residential/r_sts_modules.html, Aug. 3, 2001, pp. 1–2.
"Crestron Residential Products: Crestron SmarTouch™ STS/STS–C Wireless RF Control System," http://www.crestron.com/products/residential/r_sts.html, Aug. 3, 2001, pp 1–2.
"Crestron Residential Products: Crestron STX–1550C 2–Way Wireless RF Color Touchpanel," http://www.crestron.com/products/residential/r_stx–1550c.html, Aug. 3, 2001, pp 1.

(List continued on next page.)

Primary Examiner—Brian Zimmerman
Assistant Examiner—Clara Yang
(74) Attorney, Agent, or Firm—Birch, Stewart, Kolasch & Birch, LLP

(57) ABSTRACT

The present invention relates to a wireless home automation system having a controller for controlling a broad variety of functions via two ways communication with a plurality of devices. The controllers and devices of the system comprises means for generating a signal comprising a destination identifier, instructions related to the input/output of the destination or source device, and a repeater identifier. The devices according to the invention are adapted to act as input/output devices and signal repeating devices. The processors of each device comprises means for, upon reception of a signal, processing said information if the destination identifier corresponds to the device identifier of the device, and means for, upon reception of a signal, transmitting a second signal holding at least said destination identifier and said instruction if the repeater identifier corresponds to the device identifier of the device.

21 Claims, 14 Drawing Sheets

U.S. PATENT DOCUMENTS

| | | |
|---|---|---|
| 4,855,713 A | 8/1989 | Brunius |
| 4,912,461 A | 3/1990 | Cenzano, Jr. et al. |
| 4,940,964 A | 7/1990 | Dao |
| 5,029,334 A | 7/1991 | Braun et al. |
| 5,054,569 A | 10/1991 | Scott et al. |
| 5,101,191 A * | 3/1992 | MacFadyen et al. ... 340/310.01 |
| 5,124,991 A | 6/1992 | Allen |
| 5,129,096 A | 7/1992 | Burns |
| 5,247,293 A | 9/1993 | Nakagawa |
| 5,247,380 A | 9/1993 | Lee et al. |
| 5,381,136 A | 1/1995 | Powers et al. |
| 5,398,257 A | 3/1995 | Groenteman |
| 5,479,400 A | 12/1995 | Dilworth et al. |
| 5,544,036 A * | 8/1996 | Brown et al. .......... 340/825.24 |
| 5,565,855 A | 10/1996 | Knibbe |
| 5,875,179 A | 2/1999 | Tikalsky |
| 5,905,442 A | 5/1999 | Mosebrook et al. |
| 6,108,614 A | 8/2000 | Lincoln et al. |
| 6,175,860 B1 | 1/2001 | Gaucher |
| 6,192,282 B1 * | 2/2001 | Smith et al. ........... 340/825.69 |
| 6,275,166 B1 * | 8/2001 | del Castillo et al. ......... 340/5.1 |

OTHER PUBLICATIONS

"Crestron ST–COM / STI–COM RS–232 / 422 COM Module: Operations Guide," Crestron Remote Control Systems, Operations Guide—DOC. 5695, pp. 1–14.

Haartsen, "BLUETOOTH—The universal radio interface for ad hoc, wireless connectivity," Ericsson Review No. 3, 1993, pp. 110–117.

Morel et al., "Requirements for Wireless Extensions of a FIP Fieldbus," Emerging Technologies and Factory Automation EFTA '96, Proceedings, 1996 IEEE Conference, vol. 1, Nov. 18–21, 1996, pp. 116–122.

Petronel Bigioi, et al. "Transparent, Dynamicaly Configurable RF Network Suitable for Home Automation Applications" IEEE Transactions on Consumer Electronics, vol. 45, No. 3, pp. 474–480, Aug. 1999.

* cited by examiner

- ■ 19 Electricity outlets
- ── 40 Electricity wires
- ● 41 Remotely controlled devices

RF HOME AUTOMATION SYSTEM COMPRISING NODES WITH DUAL FUNCTIONALITY

This application is a continuation-in-part of application Ser. No. 09/547,055 filed on Apr. 10, 2000 now abandoned, the entire contents of which are hereby incorporated by reference.

FIELD OF THE INVENTION

The present invention relates to a wireless home automation system having a controller for controlling a broad variety of functions via two ways communication with a plurality of devices. More specifically, the invention relates to a new and flexible way of establishing a wireless network by using devices which functions as both input/output devices and repeaters. By establishing an even distribution of these dual-functionality devices, the user can reach any device without use of dedicated repeater stations.

BACKGROUND OF THE INVENTION

Home automation systems for controlling devices with various functions such as lighting and audio equipment within a building has evolved towards a "smart-home" concept, where different input/output (I/O) devices with a wide range of functions are remotely controlled by a central controller. Such systems are constructed as networks with a plurality of nodes which can be controllers, I/O devices, or dedicated signal repeaters or amplifiers.

The quality of such systems are typically defined by a number of parameters:

Reliability. How often is a signal erroneous received by the intended receiver, or not received at all. The reliability can be quantified in a number of ways such as MTBF or bit error rate, and a many types of errors can be detected and corrected automatically by the system. Reliability, as a quality parameter, is best described as whether the user regularly experiences that the system does not perform the desired task.

Range/coverage. How large a network can be supported by the system, and is there any required minimum density of signal repeaters or amplifiers. Also, can a node be connected to the network to send and receive signals anywhere within the range of the network, or are there any "dead spots".

Versatility. Which types of I/O devices and functions can be controlled by the system, and can the network support the required signals used for these applications. Can the network topology be expanded with new functionalities without undue burden and does the system/network support a large number of nodes. These considerations are often related to a communication protocol of the system, and depends on whether the communication protocol is constructed with a specific application in mind or optimized to a specific type of I/O devices.

Flexibility. The system should be easy to install, set up, change, and use. Thus, the learning of new nodes and configuring of routes for signal transmission should be automated to at least some degree. Also, the programming and use of functions, as well as expansion of the system, should be a simple and straightforward tasks for the user. This even more so in home automation systems for use in private homes.

Automation systems based on wired networks provide a high quality in the first three quality parameters and very seldomly in the fourth parameter, and are often the primary choice in high capacity and high security systems where a high quality is required. However, wired networks have a number of obvious drawbacks:

Dependency of medium. The disconnection of an important wire section may freeze the entire network.

Low flexibility. Wired networks are very inflexible, if a node is desired at a position outside the existing network, or at a position within the network, which is connected with wire, a new wire branch must be drawn and connected to the network.

Installation. The initial installation of the network, drawing and connecting wire, as well as extension of an existing network are laborious and often require assistance from professional personnel.

Price. The costs in connection with installation and extension of wired networks are extremely high. If a wired network for an automation system is to be installed in a family-size private home, the expenses for having the wires drawn and connected may add up to U.S. Dollars 10.000 if installed during construction of the house, and to U.S. Dollars 25.000 if to be installed in an existing house. On top of this comes the price for controllers, I/O devices, and signal repeaters or amplifiers.

Although wired networks generally provide a better quality, wireless networks have become more and more popular as a cheap and easy accessible network solution. Wireless networks clearly overcome the above-mentioned drawbacks of wired networks. However, most existing low cost wireless automation systems have a low quality in most of the mentioned parameters. Higher bandwidth wireless automation systems, are typically very complex and require higher processing power whereby the price get close to the price for a wired network.

U.S. Pat. No. 5,905,442 discloses a wireless automation system with a centralized remote control which controls I/O devices for providing electrical power to appliances from power outlets of the power mains in building. The remote control and I/O devices comprise RF transceivers, and the system includes dedicated repeater units for repeating signals to I/O devices out of the range of the remote control.

U.S. Pat. No. 5,875,179 describes a method for synchronising communications over a backbone architecture in a wireless network. The system invokes two controllers, one of which is a master and another which is an alternate master which will be activated only when the master is out of work. Dedicated repeaters and I/O devices in the system are commonly designated as nodes, however, it is clear from the context that there is distinct functional difference between repeater nodes and end (I/O) nodes.

U.S. Pat. No. 4,427,968 discloses a wireless automation system with flexible message routing. A central station produces a signal for a I/O device, the signal contains a route code, an address code, an identifying code and a message code. Dedicated repeaters in the architecture receive the signals and follow a specified procedure for repeating signal. Repeaters may also be addressed as end nodes, e.g. in order for the controller to download routing tables.

U.S. Pat. No. 4,250,489 describes a communication system having dedicated repeaters organised in a pyramidal configuration. The repeaters are bidirectionally addressable and may receive interrogation signals telling a repeater that it is the last repeater in the chain. The repeaters are not connected to appliances and do not perform any functions besides repeating and routing signals.

SUMMARY OF THE INVENTION

The present invention provides a high quality, low cost wireless automation system using radio frequency (RF)

signals. In order to reduce the price, the system according to the present invention preferably operates at bandwidth dedicated for control commands i.e. a bandwidth around 10 kbps. Such a low bandwidth allows for chips which can be mass produced at lower prices than chips for large bandwidth systems. Also, RF transmitters and receivers of the system preferably operate within a "public" frequency range wherein a license is not required, thereby further reducing cost.

However, choosing low bandwidth operation in a public frequency range introduces a number of problems which may reduce the quality of the system:

A low bandwidth gives a low capacity in the amount of data which can be comprised in signals.

A large number of apparatuses operate in public frequency ranges resulting in a large amount of radio frequency interference.

The allowed transmission power of RF transmitters is restricted which results in a limited signal range.

To overcome those problems, the system according to the present invention is optimized to ensure a high reliability, range/coverage, versatility, and flexibility.

In order to ensure a high reliability, range/coverage, versatility, and flexibility, the system according to the present invention provides a system having a new and inventive routing architecture for wireless networks which allows for much more complete and flexible routing schemes when compared to the systems of the prior art.

It is an object of the present invention to provide a wireless home automation system which greatly improves the quality of wireless networks in terms of reliability, range/coverage, versatility, and flexibility.

It is another object of the present invention to provide a wireless home automation system which provides a network of controllers and devices with an improved routing scheme which is highly flexible and dynamical in order to take into account addition and removal of devices as well as devices and controllers that change location.

It is still another object of the present invention to provide a wireless home automation system with a large and dynamical range and improved coverage, in which no dedicated repeater stations is needed in the network.

It is a further object of the present invention to provide a wireless home automation system using radio frequency signals, thereby providing flexibility in terms of the physical placement of controllers and devices and yet providing fault tolerance or user feed-back in case of malfunction.

It is a still further object of the of the present invention to provide a wireless home automation system that is flexible to a dynamically changing topology, in that the system allows for physical expansion of the network without the use of dedicated repeater stations.

In a first aspect, the invention provides an automation system for controlling and monitoring devices comprising: a plurality of devices to be controlled, each device comprising:
  a radio frequency receiver for receiving signals,
  a radio frequency transmitter for transmitting signals,
  a processor for administering the reception and transmission of signals,
  a first memory adapted to hold a device identifier identifying the device, and
  means for providing an output to, or receiving an input from, an appliance operationally connected to the device, a first controller comprising:
  a radio frequency transmitter for transmitting signals,
  a radio frequency receiver for receiving signals,
  a first memory holding a first identifier,
  a second memory adapted to hold a plurality of device identifiers, and
  a processor for administering the reception and transmission of signals and being adapted to store one or more device identifiers in the second memory, the processor comprising means for generating a first signal comprising one or more destination identifiers corresponding to device identifiers of one or more destination devices, information related to the operation of the appliances connected to said destination devices, and, if necessary, repeater identifiers corresponding to one or more signal repeating devices, wherein one or more of the plurality of devices are further adapted to act as signal repeating devices in that the processors of each of said one or more devices comprises means for, upon reception of a first signal, processing said information in its processor if one of the one or more destination identifiers corresponds to the device identifier of the device, and means for, upon reception of a first signal, transmitting a second signal holding at least said destination identifier and said information if one of the one or more repeater identifiers correspond to the device identifier of the device.

A first signal is preferably a signal comprising:
  destination identifiers which are the identifiers of controllers or devices to which the signal is addressed, hence, named destination controllers/devices,
  information related to the operation of an appliance connected to a device, and
  repeater identifiers which are identifiers of devices which should repeat the signal, hence, named signal repeating devices.

Preferably, the processors of each of the plurality of devices also comprise means for generating a first signal comprising one or more destination identifiers, information related to the operation of the appliance connected the device, and repeater identifiers.

Hence, in order to reach devices or controllers outside the signal range of a transmitter, the first aspect of the present invention provides one or more devices having a dual functionality in that they can act as I/O devices as well as repeaters. The signal range of a transmitter is the physical range within which a device/controller will receive a signal addressed for that device/controller when the signal is transmitted from the transmitter. When a device receives a signal carrying information and designating the device's identifier as a repeater identifier, the device will repeat the signal, that is, transmit a signal carrying at least part of the information also carried by the received signal. Thereby devices or controllers within the signal range of the repeating device, but outside the signal range of the original transmitter, can receive the signal transmitted by the repeating device. Preferably all devices in a system can act as repeating devices.

Preferably, the system can build a routing table held in the second memory of the first controller, the routing table indicating, for each device, other devices which can receive and process a signal transmitted by said device and vice versa. In this case, the processor of the first controller preferably comprises means for identifying, in the routing table, device identifiers of devices for repeating a first signal having a predetermined destination identifier, and to include said device identifiers as repeater identifiers in the first signal.

Alternatively, the system is preferably adapted to designate devices to be repeaters on a provisional basis. Preferably, each controller comprises a program for systematically designating device to act as repeating devices. Optionally, the program also builds a data table comprising the identifiers of the devices designated as repeaters and the identifiers of at least some of the devices, which are within the signal range of each repeater.

Devices will be repeaters only on a provisional basis, since the controller may remove the device identifier of a repeating device from the repeater table at any time, e.g. when located in another position in the network. Alternatively, the program builds a data table comprising the identifiers of all devices controlled by the first controller, and the identifier of the one or more repeaters, which must be used in order to reach each device.

The dual functionality of devices according to the present invention has a number of significant advantages:

There is no need for dedicated repeater stations which results in the following advantages: the system comprises fewer nodes than systems according to the prior art, the system becomes cheaper, the system becomes easier to install since the user does not have to setup an even distribution of dedicated repeater stations. Thus, the present invention greatly improves the price and the flexibility of wireless networks.

The system has a network with as many potential repeaters as there are devices which results in the following advantages: The number of possible routes to any given device is immensely increased in relation to networks of the prior art. The number of possible routes to a device is an extremely important parameter in RF networks since a lot of environmental features may block signals coming from certain directions. One of the most encountered causes of signal transmission errors in RF systems are metal objects which either blocks the path to a device, or is positioned in the vicinity of the device reflecting the signal so that it interferes with the original non-reflected signal. Hence, when encountering a signal transmission error, the system according to the present invention may chose between a large number of alternative routes to the destination device, which routes have a high chance of success simply because they transmit from another direction/position. Thus, the present invention greatly improves the reliability, range and coverage of RF networks. Also, it greatly improves the versatility, expandability, and flexibility of the network since the network topology be changed without undue burden.

Preferably, the devices establishes a network which can reach all devices in the system. However, in cases where a device or a group of devices is located far away from the remaining part of the network, it may be necessary to include one or more devices between the remaining system and the remote device/group with the sole purpose of repeating signals to the remote device/group. The inserted devices may of course be connected to an appliance and function also as normal input/output devices later on. In order to establish a network with good coverage, it may be preferable to build a network with a substantially uniform distribution of devices and with a minimum density of devices. This will ensure that all devices can be reached. The minimum density of devices should be adjusted to the average range of the transmitters, which, however, depends strongly upon the environment.

In the present specification and claims, the term "processor" designates any conventional or proprietary processor or microprocessor such as a hardwired proprietary processor or finite state machine, Read Only Memory (ROM) or software programmable microprocessor as well as combinations thereof capable of providing the required management of received and transmitted data.

The term "memory" designates one or several memory areas adapted to store digital information. Preferably, it is possible to read, write and delete data in the memory. The memory might be allocated in a larger memory structure comprising several memories utilized by a processor for e.g. application program storage and/or data storage.

The term "signal" designates a conveyor of information, such as a series of pulses of electromagnetic (RF) radiation. Preferably, the signal is formed by a modulation of a carrier waveform and recovered during reception by demodulation. The modulations may be digital modulations so as to convey digital information. The information in a signal according to the present invention is preferably comprised in a digital communication frame, which comprises a number of bits identifying the frame and a number of bits conveying the transmitted information or data.

An identifier is a data string identifying a controller or a device or part of a device. Also, an identifier may identify a data structure such as a table or dedicated memory area. An identifier may be a name, a code or a number.

Controller and device identifiers are data strings identifying the individual controller or device as single, specific controller or devices within a network. Controller or device identifiers are preferably used to address the specific controller or device in communication within a network. Preferably, the controller or device identifiers are used to designate the specific controller or device within a communication protocol, which is an agreed set of operational procedures to enable data to be transferred between controller and devices. A unique identifier is a data string identifying a single, specific controller or device wherein the data string is not identical to any data string used to identify any other specific controller or device. A unique identifier is preferably set during fabrication.

In the automation system according to the present invention, a network is preferably characterized by a unique system identifier, which is used in all communication within the system. Hence, identifiers for controllers and devices comprise a first and a second part, wherein the first part is the unique system identifier and the second part is the identifier for each specific controller or device within the system. In this case, the two-part identifier identifying a controller or device is unique if the system identifier is unique. Preferably, the controllers does have unique identifiers set during fabrication, and the processor of the first controller implemented in the system is adapted to make its unique identifier the unique system identifier.

Alternatively, all controllers and devices in the system have a unique identifier so that no two controllers or devices are addressed identically.

Preferably, the processor of a controller is adapted to generate signals comprising at least one device identifier and at least one predetermined setting held in relation to said device identifier. Also, the first processor is adapted to generate a signal comprising commands for devices and addressing the signal to one or more devices. A command is a code, word or phrase to which the receiving processor responds in a predetermined way. A respond is any action carried out by the controller or device initiated by the reception of the command.

Optionally, signals comprising commands for devices may be addressed to all devices without addressing each device individually, instead a general designation to which all signals are adapted to respond is used. Such signals are referred to as broadcast signals. For this reason, the devices further comprise a status setting for determining whether the device should respond to commands in a broadcast signal addressed to all devices.

The first device of the system according to the present invention may be an output device in that it is adapted to generate an output in response to a received signal. Preferably, the output generated by the first device is adjusted in response to a signal transmitted from the first controller. Thus, the user can control the output from the first device.

The output is a signal to an appliance operationally connected to the first device, and comprises one or more instructions related to the operational state of the appliance. The appliance connected to an output device may be integrated with the output device so that the appliance and the output device form parts of the same unit. Thereby the user may control the operation of the appliance by controlling the first device. Hence the user may operate the appliance remotely.

In a preferred embodiment, the output from the first device is electric power in the form of electric current or an electric potential. In this case, the first device may adjust the output power to a level corresponding to a setting comprised in a received signal, that is, the user may turn the output on or off or adjust the output level to any desired power.

In another preferred embodiment, the user can restrict the operation and hence the output from the first device, and protect this restriction by a requiring code or a predetermined action before removing the restriction. Thereby, the user can prohibit other users from changing the operational state of the device. The restriction may also be a fixed operational state of the device. This may be e.g. an "off" state where the device provides no output, a state where the device provides a certain type of output such as a certain signal to an appliance connected to the output, a state where the output is allowed to be adjusted only within a predetermined range or within a predetermined time or both, a state where the output is adjusted according to a predetermined program, etc. In this case, the first device restricts the output in response to a received first set of instructions, and the restriction may only be removed in response to either a received second set of instructions or a code or predetermined action given directly to the device by the user. Also, the first controller is preferably adapted to generate the second set of instructions only when provided with the predetermined code, password or alike.

In another preferred embodiment, the first device is adapted to receive an input from the appliance connected thereto: In this case, the processor of a device is preferably adapted to, in response to the received input, generate and transmit a first signal to a controller or to another device. The appliance connected to an input device may be integrated with the input device so that the appliance and the input device form parts of the same unit. Preferably, the appliance operationally connected to the input device is a sensor, and the sensor, upon sensing a signal, forms a signal, which is received by the processor of the input device as an input. Preferably the signal from the sensor is an electric signal.

The processor may process the received input, e.g. store the input in the second memory of the first device, generated and transmit a signal comprising the input, store the input in the second memory of the first device and at a later time generate and transmit a signal comprising the input, generate and transmit a signal in response to the received input, etc.

The first sensor may be any sensor selected from the group consisting of electromagnetic radiation sensor, luminosity sensor, moisture sensor, movement sensor, temperature sensor, mechanical actuator contact, sound sensor, pressure sensor, electric signal sensor, smoke detector, audio pattern recognizing means, visual pattern recognizing means, molecular composition analyzing means and more as well as any combinations thereof.

In a preferred embodiment, the sensor measures the impedance of an electric signal, such as the capacitance, the resistance or the inductance.

The system according to the present invention preferably comprises a protocol. A protocol is any set of operational procedures, which enable data such as identifiers, settings and frames and any data comprised in a frame as well as stored data to be transferred and administered within the system. Thus, the means for generating a first signal, and various means comprised in these means, are typically programs or routines forming part of the protocol. Preferably, it is the protocol of the transmitting controller/device which generates frames to be transmitted in a signal. Such frame preferably designates the system, the source controller/device and the destination controller/device by their identifiers, and one or more signal repeating devices by their identifiers. Also, the protocol includes the commands, information or data transferred by the frame. Likewise, it is preferably the protocol in the receiving part, which reads the received frame and enables the receiving part to respond to the signal.

In order to reduce the amount of data transferred in each frame, the system protocol preferably comprises operational procedures for masking the identifiers of devices addressed by a frame. The making procedure is an operation that builds a register with each entry corresponding to a device, and where the value of each entry indicates whether the corresponding devices should respond to a command in the frame or not. Instead of including all the identifiers for the devices that should respond to a command in a frame one includes the masking register, whereby a shorthand designation of devices is achieved. Thus, the system protocol preferably comprises operational procedures for generating a first type of frame comprising one or more commands. The protocol comprising a procedure of masking a first group of device identifiers in a table of a controller in order to generate a string of bits forming part of the frame, so that each bit corresponds to a device identifier and a device of the first group, the value of each bit determining whether the one or more commands applies to the corresponding device. Hence, according to the first aspect, the destination identifiers held in a signal may not be identical to the identifiers of the addressed devices, if the destination identifiers (or equivalently the repeater identifiers) is masked, the destination identifiers merely corresponds to the identifiers of the addressed devices.

Similarly, the system protocol preferably comprises operational procedures for applying a masking procedure to the commands issued in a frame. Typically a considerable amount of the commands, status messages, information, data etc. distributed in the system is standard instructions. Hence the devices may already know these and the data transmission can be reduced by applying a masking procedure to these different types of standard instructions. Thus, the system protocol preferably comprises operational procedures adapted to generate and transmit a frame of a second type comprising two or more instructions from a second table of instructions comprised in the memory of a controller. The protocol comprises a procedure of masking a first group of instructions in the table of the controller in order to generate a string of bits forming part of the frame, so that each bit corresponds to an instruction of the first group, the value of said bit determining whether the one or more corresponding instructions applies to devices receiving the frame.

When the system is adapted to perform a specified function, the protocol will often, but not always, comprise one or more commands for performing the specified function.

The processors of the first and second controllers preferably further comprise means for dynamically assigning controller identifiers to a controller or a device upon introduction of the controller or the device in the system. These means assigns identifiers using a predetermined sequence of controller or device identifiers.

According to the first aspect, the controllers of the system preferably comprises a display, means for displaying a plurality of menus having a two or more entries on the display, two or more actuators for navigating in said menus and for selecting said entries, and routines or programs stored in said processor which can be activated by selecting appropriate entries in appropriate menus. Preferably said routines or programs is operationally connected to said means for generating a signal addressed to one or more devices or to a controller so that the user can control the system by selecting entries using the actuators.

In a second aspect, the present invention provides a method for establishing an RF automation system network for controlling and monitoring devices, said method comprising the steps of:
providing a first controller comprising:
a radio frequency transmitter for transmitting signals,
a radio frequency receiver for receiving signals,
a first memory holding a controller identifier,
a second memory adapted to hold a plurality of device identifiers, and
a processor for administering the reception and transmission of signals and being adapted to store one or more device identifiers in the second memory,
providing a plurality of devices to be controlled by the first controller, each device comprising:
a radio frequency receiver for receiving signals,
a radio frequency transmitter for transmitting signals,
a processor for administering the reception and transmission of signals,
a first memory adapted to hold a device identifier identifying the device, and
a processor for administering the reception and transmission of signals and being adapted to provide an output to, or receive an input from, an appliance operationally connected to the device,
generating a first signal comprising one or more destination identifiers corresponding to identifiers of one or more destination devices or destination controllers, information related to the operation of an appliance connected to a device, and one or more repeater identifiers corresponding to one or more signal repeating devices,
transmitting said first signal,
receiving the first signal at one of said plurality of devices,
if one of the one or more destination identifiers corresponds to the device identifier of the receiving device, then processing said information in the processor of the device, and
if one of the one or more repeater identifiers correspond to the device identifier of the receiving device, then transmitting a second signal holding at least said one or more destination identifiers and said information.

Preferably, the first signal is transmitted by the first controller and the one or more destination identifiers comprised in the first signal is a device identifier. Also, the information comprised in the first signal preferably comprises instructions to a processor of the destination device to provide an output to, or receive an input from, the appliance connected to the destination device.

Alternatively, the first signal is transmitted by a device and the destination identifier comprised in the first signal is a controller identifier. In this case, the information held by the first signal is preferably related to a state or a reading of the device transmitting the first signal.

In order to designate devices as signal repeating devices by including their identifiers as repeater identifiers in the first signal, the first controller preferably holds a routing table indicating, for each device, other devices which can receive and process a signal transmitted by said device. Thus, the method according to the second aspect preferably comprises the steps of building a routing table and storing the routing table in the second memory of the first controller.

Further, the processor of the first controller preferably performs the steps of identifying device identifiers in the routing table of devices for repeating a first signal having a predetermined destination identifier, and including said device identifiers as repeater identifiers in the first signal.

Preferably, all devices in the system are adapted to respond to all received signals which were addressed to them with an acknowledgement signal. Hence, the method according to the second aspect of the present invention preferably further comprises the step of, upon receiving a first or a second signal at a device, generate and transmit an acknowledgement signal having the identifier of the device or controller transmitting the first or second signal as destination identifier.

If the device has received a second signal, that is a signal which has been repeated, it should preferably send an acknowledgement signal to both the controller transmitting the first signal and the repeater device transmitting the second signal. The acknowledgement signal to the controller transmitting the first signal preferably comprises a destination identifier and one or more repeater identifiers, hence, the method preferably further comprises the steps of receiving said acknowledgement signal at a device and if one of the one or more repeater identifiers correspond to the device identifier of this device, then transmitting a signal holding said destination identifiers and the acknowledgement.

DETAILED DESCRIPTION OF THE PREFERRED EMBODIMENTS

The present invention relates to an RF home automation system having a controller for controlling a broad variety of functions via two ways communication with a plurality of devices.

A controller allows the user to control the devices and the functions performed by the devices. Controllers are typically small and battery powered in order to make it a portable, handheld device.

Figure 1:
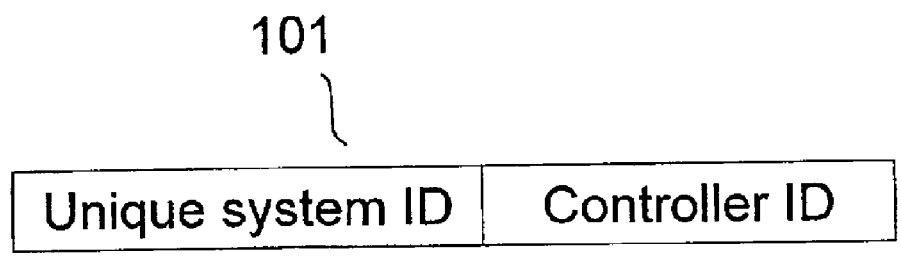
FIGS. 1 and 2 are diagrams illustrating the identifiers for controllers and devices used to address signals according to a first preferred embodiment of the present invention.
Figure 1:
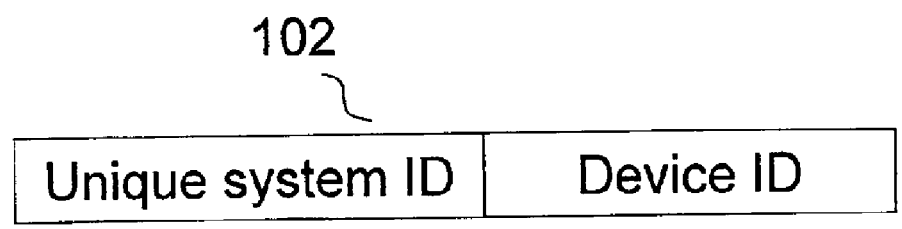

According to a first preferred embodiment of the present invention, the system comprises a communication protocol providing a simple addressing of devices and controllers. First, the controllers and devices in a building are combined into a unique logical system characterized by a unique system identifier comprised in almost all communication signals within the system. The controllers and the devices in the system are individually characterized and addressed by identifiers. FIG. 1 shows examples of such two-part identifiers 101 and 102 for addressing a controller and a device in a signal respectively.

Each controller has a pre-set unique identifier which is written in a memory in the controllers from factory and which cannot be altered. This ensures the uniqueness of the controller identifiers.

Thereby a system does not interfere with a neighboring system since controllers and devices in the respective systems respond only to signals comprising the unique system identifier of the respective systems. The system identifier will be called the Home ID in the following.

Figure 2:
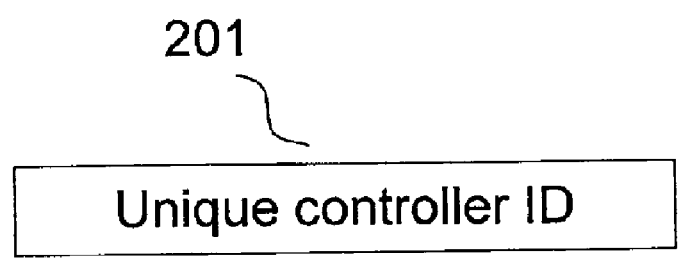
Figure 2:
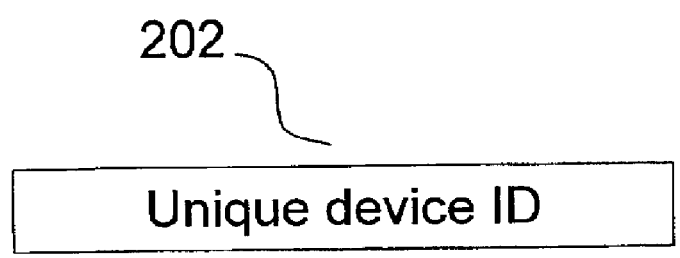

In an alternative embodiment illustrated in FIG. 2, all controllers and all devices have pre-set unique identifiers 201 and 202 written in a memory during fabrication and which cannot be altered. The controllers of the system must learn the unique identifiers from all devices to be controlled by the controller. Since all of these one-part identifiers are unique, there is no need for a system identifier.

In the first preferred embodiment, the unique Home ID is the identifier of the first controller utilized in a system and is assigned to the system when the system is set up. Since the controller identifier is unique, so is the assigned Home ID. It is an advantage that the system inherently has a unique Home ID, thereby the user does not have to specify a Home ID when setting up the system. This greatly simplifies the functionality of the system.

Since a device is always addressed together with the designation of the system, the device identifier is an extension to the Home ID of the system for identifying the device within the system. The device identifiers, hereafter Device ID's, are assigned to the devices by the controller when a device is incorporated in the system for the first time. The device identifier is stored in the controller and in the device itself. In order to minimize the use of frame space and also to reduce storage on the controller, the device identifiers identifying the devices has to be kept as small as possible. Hence a device can be addressed non-uniquely by giving only its device ID, or it can be addressed uniquely by giving its Home ID plus its device ID.

Communication Protocol

All controllers and devices comprise at least parts of a common protocol for transferring and administering data within the system. The protocol is a software protocol, optionally, parts of the protocol comprises hardwired units such as integrated circuits and microprocessors. The protocol administers identifiers and manages the addressing of frames for communication within the system.

In the first preferred embodiment, a Device ID's is an 8 bit value. As mentioned in the above, the Device ID is always used in relation to a Home ID in a frame in the communication protocol, thereby preserving the all-over uniqueness of a device. The size of the unique controller identifier, and thereby of the Home ID, has to have such a size that we would never run out of unique addresses. The controller identifier is therefore a 32 bit value giving up to 4294967295 unique Home ID's.

The communication protocol designed to overcome the usual problems seen in radio communication applications. The most common problem is noise, which can cause the data communicated between two devices to be lost or corrupted. The general rule is that the less data being transferred the bigger chance there is for a successful transfer.

In the prior art, the size of the frame format holding the data to be sent is not of very high importance, since it typically takes up a very small part of the total amount of data bits. However, in the present invention where the system is used to send short commands and instructions, the frame format often makes up a considerable amount of the data bits to be sent. Therefore, the general format of the frames used in the communication protocol of a preferred embodiment of the present invention, is designed to reduce the amount of data, i.e. to obtain a short frame, is to be able to send commands to more than one device in one single frame and to address these devices in a concise notation. Similarly, the commands comprised in the frame should also be minimized. The protocol designed for the present invention take these considerations into account in that it provides masking of device identifiers and commands as well as compression of data.

Controllers and devices in the first preferred embodiment comprise certain elements:

Controllers:
  An RF transmitter and an RF receiver
  Memory holding the controller identifier and the Home ID
  Memory holding Device ID's of devices controlled by the controller
  A processor for performing the storage and administration of information and for generating and processing the communication frames.

Devices:
  An RF transmitter and an RF receiver
  Memory holding the Device ID of the device Memory holding the Home ID A processor for performing the storage and administration of information.

The devices to be controlled may perform several functions, which can be divided into types of functions:

Output; to provide an output such as a command, an instruction, a message or electrical power to an electric appliance connected thereto, e.g. a coffee machine, an oven, a surveillance system, a door lock, audio equipment etc.

Input; to receive an input from an appliance such as a sensor or an input unit such as a keyboard or a pointing device connected thereto and store, process and/or transmit the input. The controllers of the system can be programmed to respond to a signal from a device receiving input, e.g. activating a sound signal and calling security in case of a detected burglary.

Repeating; for repeating signals from a controller or from a device in order to reach devices outside the signal range of the transmitting controller or device.

A device can be separated unit connected to the appliance, or a device can be an integrated part of the appliance. A device can perform a function itself or it can permit, instruct or make capable an appliance connected to the device to perform a function.

The user interface of a controller allows the user to control each device controlled by the controller. The devices controlled by the controller can be ordered in different output classes so that two or more devices can be controlled together. Such output classes can be characterized by a set of variables such as:

| Output Class | Characteristic Variables | Comments |
| --- | --- | --- |
| Output device | Device ID | Consists of a device |
| Groups | Group ID Device ID | Consists of several devices |
| Moods | Mood ID Group ID's Device ID's Settings | Consists of several devices and/or groups and an individual pre-set setting for each device or group of devices. |

Groups are an output class consisting of several devices. This output class is utilized for controlling multiple output devices with one single command. Moods are essentially "groups of groups" and/or "groups of devices" in which each group and/or device has specific settings characterizing the operation of the devices and groups. For example, a mood can consist of devices connected to lamps in the living room and the settings could be a dimming level in the power supplied to each lamp by each device. By selecting this mood, all lamps in the living room can be dimmed to a predetermined level creating desired lighting for e.g. TV watching. The settings of devices or groups depend on the function performed by each device and are set individually for devices and groups. One device may belong to one or more groups and each Group may belong to one or more moods.

Frames

The communication protocol of the first embodiment has a general format for the frames carrying the instructions and information between the devices of the system.

The frame format according to the first embodiment can be described as:

TABLE 1

| 15 | 14 | 13 | 12 | 11 | 10 | 9 | 8 | 7 | 6 | 5 | 4 | 3 | 2 | 1 | 0 |
| --- | --- | --- | --- | --- | --- | --- | --- | --- | --- | --- | --- | --- | --- | --- | --- |
| Home ID (Low word) ||||||||||||||||
| Home ID (High word) ||||||||||||||||
| Version ||| Dir | Type |||| Source ID ||||||||
| Command |||||||| Length (bytes, ex. Checksum) ||||||||
| Data byte 0 |||||||| Command value ||||||||
| Checksum |||||||| Data byte n ||||||||

Wherein:

The numbers 0 through 15 represent a bit-scale giving the order and sizes of each part of the frame. The order in which the parts appear are not restrictive and different orders can be used.

Home ID (32 bit): The Home ID of the system in which this frame should be executed/received.

Source ID (8-bit): The identifier (second part of the two-part identifier) of the transmitting controller or device.

Version (3 bit): Protocol/frame format version. This gives the freedom to change the frame format according to an update of the software protocol or other infrastructure enhancements.

Dir. (1 bit): Direction of command; 0 when a command is issued, 1 when a command is acknowledged.

Type (4 bit): The type of frame decides the contents of the rest of the frame, whether the frame contains a command or e.g. a status, and how the designation of devices is carried out. The designation depends on which and how many devices should be addressed. Some examples of possible frame types are:

TABLE 2

Frame Types

| Type field | Type function |
| --- | --- |
| 0 (0000) | Invalid use |
| 1 (0001) | Command for a single device |
| 2 (0010) | Command for a group of devices |
| 3 (0011) | Command for a group of devices, masked (Device ID 1–8) |
| 4 (0100) | Command for a group of devices, masked (Device ID 9–16) |
| 5 (0101) | Command for a group of devices, masked (Device ID 1–16) |
| 6 (0101) | Command for a group of devices in same single mask range (*) |
| 7 (0111) | Command for a single device (repeat path) |
| 8 (1000) | Command for a group of devices (repeat path) |
| 9 (1001) | Command for a group of devices, masked (Device ID 1–8) (repeat path) |
| 10 (1010) | Command for a group of devices, masked (Device ID 9–16) (repeat path) |
| 11 (1011) | Command for a group of devices, masked (Device ID 1–16) (repeat path) |
| 12 (1100) | Command for a group of devices in same single mask range (*)(repeat path). |

*) Each mask range is in step of 8 consecutive devices in step of 8. Ex. Range 0 = 1–8, Range 1: 9–16

Length (8 bit): Amount of bytes in the frame starting from the first Home ID word until the last data byte without checksum field.

Command (8 bit): The command that should be performed. See examples of commands in Table 3.

Command Value (8 bit): The actual value of the issued command. Typically an 8-bit value but may be longer depending on the command.

Data byte (0–n): The data contained in the frame.

Checksum (8 bit): Checksum calculated between Home ID and the last byte of the frame. The Checksum field itself is not in calculated.

In the following, some examples of information exceeding the general frame format that can be comprised in a frame are given.

The following table shows some examples of commands and command values that can be issued in a frame:

TABLE 3

| Command function | Command | Command Value |
|---|---|---|
| Invalid value | 0 | Non applicable |
| Toggle switch on | 1 | Non applicable |
| Toggle switch off | 2 | Non applicable |
| Start Dim | 3 | Dim Level to start from |
| Stop Dim | 4 | Non applicable |
| All Off | 5 | Non applicable |
| All On | 6 | Non applicable |
| Delete All Switches | 7 | Non applicable |
| Request Device Info | 8 | Non applicable |
| Set Dim | 9 | Dim Level |
| Enable repeat Path | 10 | Non applicable |
| Disable Repeat path | 11 | Non applicable |
| Set Device trigger level | 12 | Trigger Level |
| Get Device trigger level | 13 | Non applicable |
| Trigger alert | 14 | Trigger level |
| Perform calibration | 15 | Non applicable |
| Request status | 16 | Non applicable |
| Supply input related data | 17 | data identifier |
| Supply output related data | 18 | data identifier |
| Supply stored data | 19 | data identifier |
| Update controller memory | 20 | Non applicable |
| Identical copy of controller | 21 | Non applicable |
| Learn Home ID | 22 | Home ID # |
| Learn Device ID | 23 | Device ID # |
| Learn Group ID | 24 | Group ID #, device ID # |
| Learn Mood ID | 25 | Mood ID #, Device/group ID #, dim level |
| Learn Routing table | 26 | Device ID, row |
| Learn Device ID | 27 | Device ID # |
| Learn Controller ID | 28 | Controller ID # |

At least command values of command 22, 24, 25, and 26 will be longer than 8 bit. The communication protocol designates the length of command values for each command. When issuing commands, it is off course important to specify which devices the command is addressed to. Depending on the number of devices to be addressed in one frame, different frame types, referring to Table 2, can be utilized. The following frame type comprises the command and the individual addresses, i.e. Device ID's, of a group of recipient devices.

TABLE 4

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| Home ID (Low word) ||||||||||||||||
| Home ID (High word) ||||||||||||||||
| Version | Dir || 0010, Type 2 |||||| Source ID |||||||
| Command |||||||| Length (bytes, ex. Checksum) ||||||||
| Number of Devices |||||||| Command value ||||||||
| Destination Device ID 1 |||||||| Destination Device ID 0 ||||||||
| Destination Device ID 3 |||||||| Destination Device ID 2 ||||||||
| Destination Device ID 5 |||||||| Destination Device ID 4 ||||||||
| Checksum |||||||| Destination Device ID n ||||||||

Destination Device ID (8 bit): Array of 8 bit destination device ID's indicating whether the receiving device should react to the command or not.

Masking

As can be seen in the above frame format, the addressing of devices makes up a considerable amount of the total data bits to be sent. It is an important feature of the communication protocol of the first embodiment of the present invention that it provides a way to reduce the addressing data bits. By using a Destination Device ID Mask in the frame format, the addressing data bits can be reduced dramatically. The masking of Device ID's is an operation that indicates whether certain of the receiving devices should react to the command or not. A register of entries, each entry corresponding to the enumeration of Device ID's, holds a bit pattern called a mask with each bit set to '1' where a corresponding Device ID is to be selected and '0' otherwise. By transmitting a frame with the frame type defining the mask range, see table 2, together with the "Destination Device ID Mask" (with each bit indicating whether the receiving device should react to the command or not), the addressing of each further only takes up 1 bit.

Three examples of masking of Device ID's are given in the following. The examples use mask sizes, types, indexing and layout according to the frame format of the first preferred embodiment of the present invention. Such masking can be carried out using other layouts and formats, and the first embodiment does not restrict the idea of using masking in the designation of devices for addressing groups of devices within any communication network.

First, with an 8 bit Destination Device ID Mask, up to eight devices with Device ID's from 1–8 can be addressed in a single byte reducing the amount of data dramatically. If eight devices should be addressed with the non-masked frame format (Command for a group of devices) the amount of data would be increased with 8 bytes (8 Device ID's and the "Number of Devices" field rather than the "Destination Device ID Mask").

TABLE 5

| 15 | 14 | 13 | 12 | 11 | 10 | 9 | 8 | 7 | 6 | 5 | 4 | 3 | 2 | 1 | 0 |
|----|----|----|----|----|----|----|----|----|----|----|----|----|----|----|----|
| \multicolumn{16}{|c|}{Home ID (Low word)} ||||||||||||||||
| \multicolumn{16}{|c|}{Home ID (High word)} ||||||||||||||||
| Version | | | Dir | | 0011, Type 3 | | | | Source ID | | | | | | |
| Command | | | | | | | | Length (bytes, ex. Checksum) | | | | | | | |
| Destination Device ID Mask | | | | | | | | Command Value | | | | | | | |
| | | | | | | | | Checksum | | | | | | | |

Destination Device ID Mask (8 bit): 1 bytes destination device ID mask with each bit indicating whether the receiving device should react to the command or not. The least significant bit (LSB) represents Device 1.

If we wanted to address devices in the range from 9–16 the only change in the frame format would be another value in the frame type field of the general frame format, namely 0100 from Table 2, the LSB in the mask would now be device ID 9.

If the devices to be addressed all have Device ID's within the interval 1 to 16, the frame format should be of the "masked Device ID 1–16" frame type. Thereby, some, or all, of the first 16 device ID's can be addressed in two bytes as shown in Table 6.

TABLE 6

| 15 | 14 | 13 | 12 | 11 | 10 | 9 | 8 | 7 | 6 | 5 | 4 | 3 | 2 | 1 | 0 |
|----|----|----|----|----|----|----|----|----|----|----|----|----|----|----|----|
| \multicolumn{16}{|c|}{Home ID (Low word)} ||||||||||||||||
| \multicolumn{16}{|c|}{Home ID (High word)} ||||||||||||||||
| Version | | | Dir | | 0101, Type 5 | | | | Source ID | | | | | | |
| Command | | | | | | | | Length (bytes, ex. Checksum) | | | | | | | |
| | | | | | | | | Command Value | | | | | | | |
| Destination Device ID Mask | | | | | | | | | | | | | | | |
| | | | | | | | | Checksum | | | | | | | |

Destination Device ID Mask (16 bit): 2 bytes destination device ID mask with each bit indicating whether the receiving device should react to the command or not. The least significant bit (LSB) represents Device 1.

Many systems in small households will have the most of its capacity covered by the 8 and 16 bit masks covering the first 16 devices. However, in large systems the devices to be addressed have Device ID's higher than 16, and depending of the number of devices, a more flexible masking procedure can advantageously be applied. Whereas the frame type field typically defines the devices corresponding to the mask, the frame type may also allow for a Mask Index range defining which 8 (or other number of) devices are covered by the following Destination Device ID Mask.

Each mask range covers 8 consecutive devices ID's in step of 8 (with the exception of frame type 5). In the frame type 6 frame format, a Mask Index (an 8 bit value) indicates which mask range the following Destination Device ID Mask covers. The mask ranges are numbered consecutively, hence Mask Index '0' indicates a Destination Device ID Mask ranging from Device ID 1 to 8. Mask Index of 1 indicates a Destination Device ID Mask ranging from 9 to 16. Using this method Device ID ranges up to Device ID 2040 (255*8) can be addressed

TABLE 7

| 15 | 14 | 13 | 12 | 11 | 10 | 9 | 8 | 7 | 6 | 5 | 4 | 3 | 2 | 1 | 0 |
|----|----|----|----|----|----|----|----|----|----|----|----|----|----|----|----|
| \multicolumn{16}{|c|}{Home ID (Low word)} ||||||||||||||||
| \multicolumn{16}{|c|}{Home ID (High word)} ||||||||||||||||
| Version | | | Dir | | 0011, Type 6 | | | | Source ID | | | | | | |
| Command | | | | | | | | Length (bytes, ex. Checksum) | | | | | | | |
| Mask Index | | | | | | | | Command Value | | | | | | | |
| Checksum | | | | | | | | Destination Device ID Mask | | | | | | | |

Mask Index (8 bit): The mask index indicates which Device ID ranges the Destination Device ID mask refers to.

Destination Device ID Mask (8 bit): 1 bytes destination device ID mask with each bit indicating whether the receiving device should react to the command or not. The least significant bit (LSB) represents Device ID=Mask Index*8+1.

A masking procedure similar to the one described above can be applied to the commands issued to different devices. Thereby, several commands from a set of predetermined commands can be issued without providing the commands as such in the frame.

By providing tables of predetermined commands such as Table 3 in the protocol on both controllers and devices, the mask will be a register of entries, each entry corresponding to the enumeration of commands, forming a bit pattern with each bit set to '1' where a corresponding command is to be selected and '0' otherwise. The command values of Table 3 can be subject to a similar masking.

In order to further reduce the size of frames, data such as arrays of measured input values, images or text strings such as program strings can be subject to data compression. The protocol can apply typical software digital data compression archive formats such as Zip, gzip, CAB, ARJ, ARC, and LZH.

Acknowledgement

Figure 3:
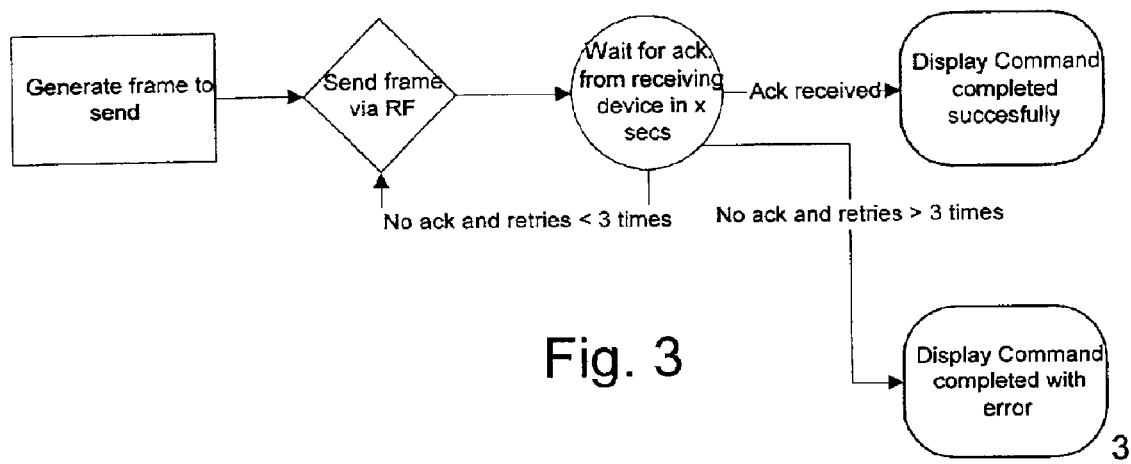
FIG. 3 is a flow diagram illustrating transmitting and acknowledgement of a command according to the first preferred embodiment of the present invention.

Data transmission using a RF carrier frequency in a typical home environment creates the possibility of transmission failure and introduction of spurious errors. The sources for introduction of errors include RF noise from other RF transceivers and electrical apparatus in general. The system of the present invention uses two-way RF components making it possible to get acknowledgment back from devices after a transmitted command has been received and executed. This procedure is outlined in the flow diagram of FIG. 3. After the device has generated and sent the frame, it waits for acknowledgement from the device(s) receiving the frame. If the transmitting device has not received an acknowledgement within a specified time, it will retry the data transmission until the data has successfully been transferred or a maximum of retries has been reached.

When a frame has been received, the receiving part is prompted acknowledge the reception by the communication protocol. The destination device that received the command returns the frame with the D bit set and the receiving parts Device ID as the only Device ID in the frame. The Command Value field is used to pass the command return value (Success, Failure, etc). When the D bit is set, all devices read the frame so that the Source ID is considered Destination Device ID.

TABLE 8

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| Home ID (Low word) | | | | | | | | | | | | | | | |
| Home ID (High word) | | | | | | | | | | | | | | | |
| Version | | | | 1 | | | | 0011, Type 3 | | | | Source ID | | | |
| Command | | | | | | | | Length (bytes, ex. Checksum) | | | | | | | |
| Destination Device ID Mask | | | | | | | | Command Return Value | | | | | | | |
| | | | | | | | | Checksum | | | | | | | |

The controller collects the acknowledgement replies and displays a "Command successfully executed" message if all devices have received and executed the issued command. If, after a maximum number of retries, the controller have not received acknowledgement replies from one or more devices, or if it receives return commands different from "Success", it can display an error or warning message. The detail of such error message depends on the capacity of the system.

Depending of the capacity of the controller, the system may build a topology map of the system network. This topology map comprises a plan of the building or site where the system is installed, with the position of the individual devices marked on the plan. Thereby it becomes possible to specify information relating to individual devices such as which devices do not acknowledge an issued command or which input device detected what and where. If the controller does not have a large capacity, each device may still be named (e.g. "Hallway Dome lamp") in order for the user to locate a device with a malfunction.

Repeating

Due to the limited range of RF signals, signal repeaters are applied in the system in order to increase the physical coverage of the system. Repeaters are known from the prior art, but the system according to the present invention includes several new features described in the following.

In the first embodiment of the present invention, all devices, whatever function they perform, are adapted to act as repeater if instructed so by a controller.

When addressing devices, it is important to take into consideration that the frame may have to be repeated by one or more times. The following frame type comprises the command, the destination identifier of the addressed device, and the repeater identifiers being the device identifiers of the devices used to repeat the signal for it to reach the destination device.

TABLE 9

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| Home ID (Low word) | | | | | | | | | | | | | | | |
| Home ID (High word) | | | | | | | | | | | | | | | |
| Version | | | Dir | | 0011, Type 7 | | | | | | Source ID | | | | |
| Command | | | | | | | | Length (bytes, ex. Checksum) | | | | | | | |
| Number of Devices | | | | | | | | Command Value | | | | | | | |
| Number of Repeaters | | | | | | | | Destination Device ID | | | | | | | |
| Repeater ID 0 | | | | | | | | Hops | | | | | | | |
| Checksum | | | | | | | | Repeater ID n | | | | | | | |

Number of repeater (8 bit): the amount of repeater ID's in the frame.

Hops (8 bit): 1 byte field indicating how many repeaters the frame has passed through. This could be used by the repeaters as an index into the repeater ID's and to see whether they have to forward this frame or not.

Repeater ID (8 bit): 1 byte repeater ID indicting which path the frame should pass through. The Hops field can be used as an index into the repeater ID list The repeater specific fields (Number of repeaters, Hops and repeater ID's) can be applied to all the above-mentioned frame types specified in Table 2 and will also be used in the acknowledgement of received frames.

The masking procedure described in relation to Tables 5 through 7 can also be applied when a large number of repeater identifiers are included in a frame.

Appointing Repeaters

To be able to transmit signals using repeaters an automated process is performed to appoint devices as repeaters. It is important that the amount of repeaters in a given system is kept to a minimum in order for the response time to be as low as possible. It is desirable not to do the automated repeater location process to often as it takes time and consumes power and thereby battery life.

Figure 4:
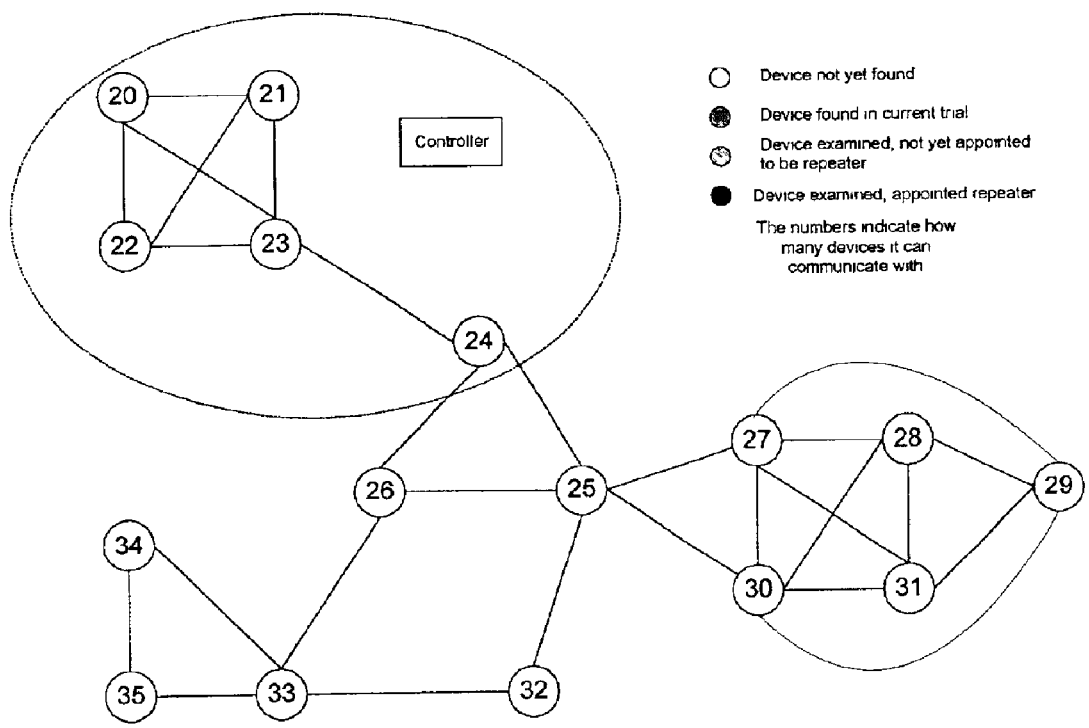
FIGS. 4 through 12 shows an example of a topology map of a system network, the figures illustrate an automated repeater detection process according to the first embodiment of the present invention.

FIG. 4 to FIG. 12 illustrates the steps of the automated repeater detection process used to appoint devices as repeaters according to the first preferred embodiment. FIG. 4 shows a topology map for the whole system. Devices within signal range of each other are connected by lines. The ellipse shows the range of the controller.

Figure 5:
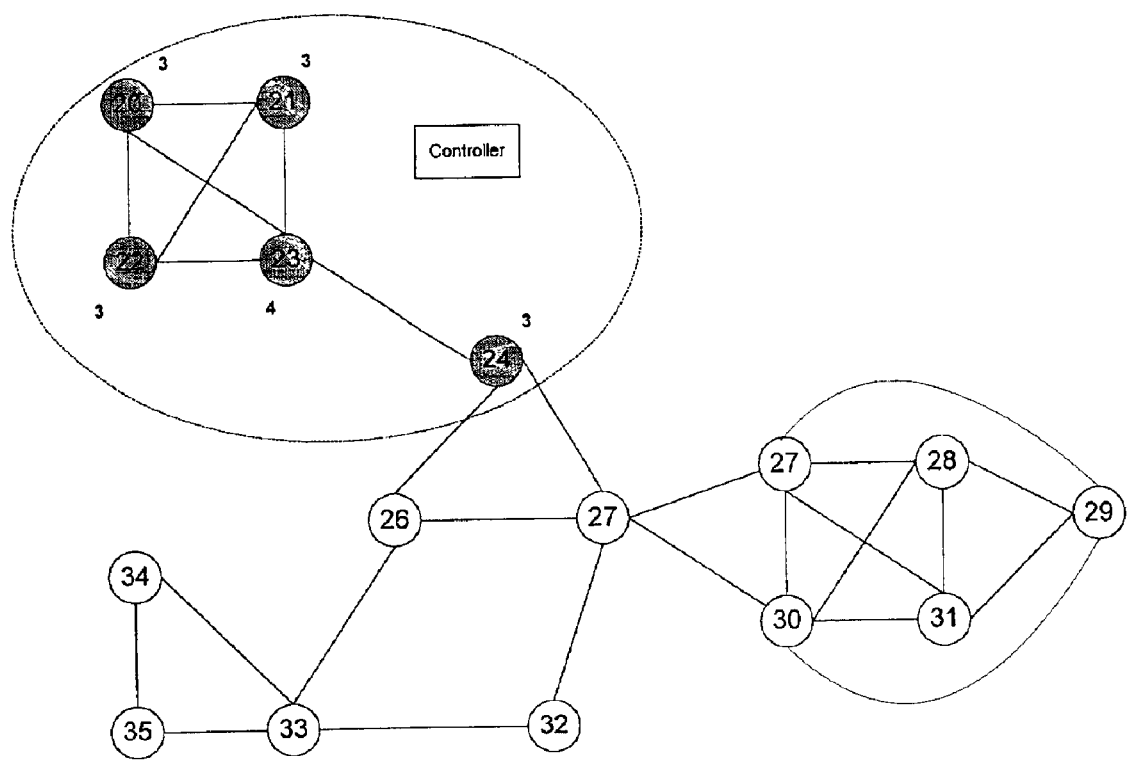

In FIG. 5 the controller asks all devices within the range of the controller, device 20, 21 22 23 and 24, of how many other devices are within their range. Device 20, 21 22 and 24 can reach three other devices and device 23 can reach four.

Figure 6:
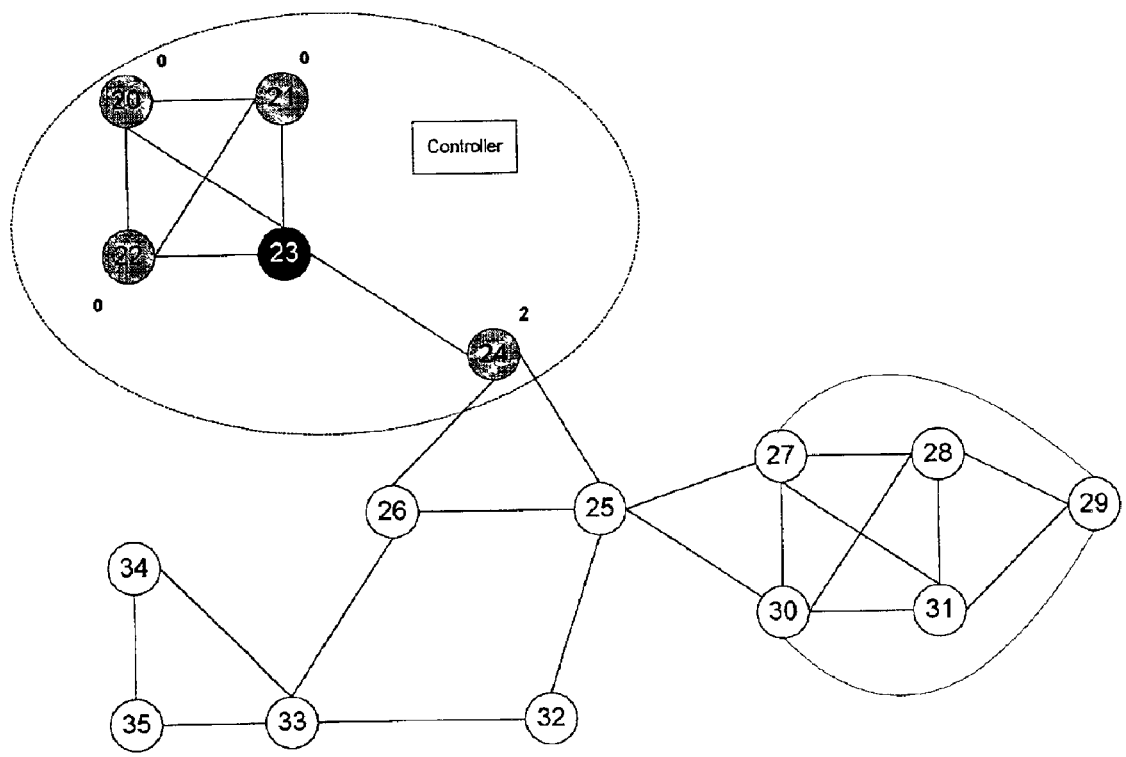

FIG. 6 shows that the device that could reach most new devices, here device 23, is now appointed Repeater. Now, each single device within the range of the controller is asked how many devices cannot reach any new devices. Device 20, 21 and 22 in the upper left corner cannot reach any, but device 24 can reach two new.

Figure 7:
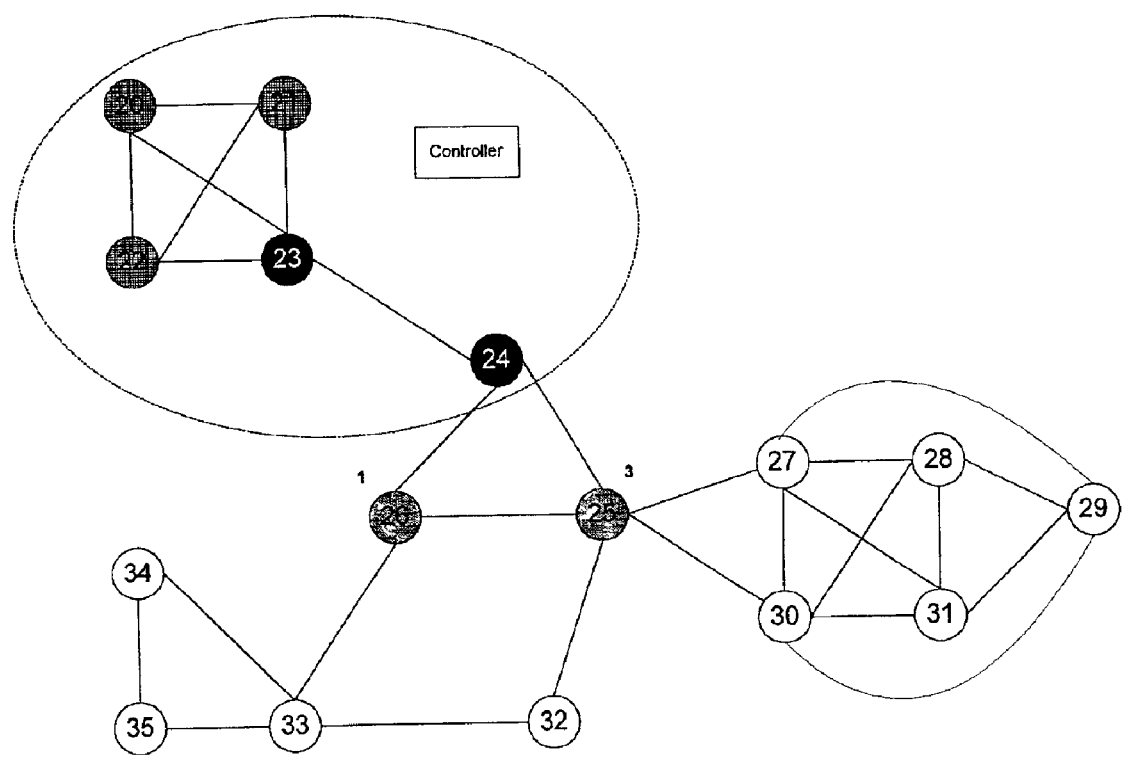

FIG. 7 shows that two devices, namely 23 and 24, have been appointed Repeaters while three devices, namely 20, 21 and 22, have been declared unsuitable as Repeaters. The newly appointed Repeater 24 can reach two new devices 25 and 26. Device 25 can reach three new devices whereas device 26 can reach one new device.

Figure 8:
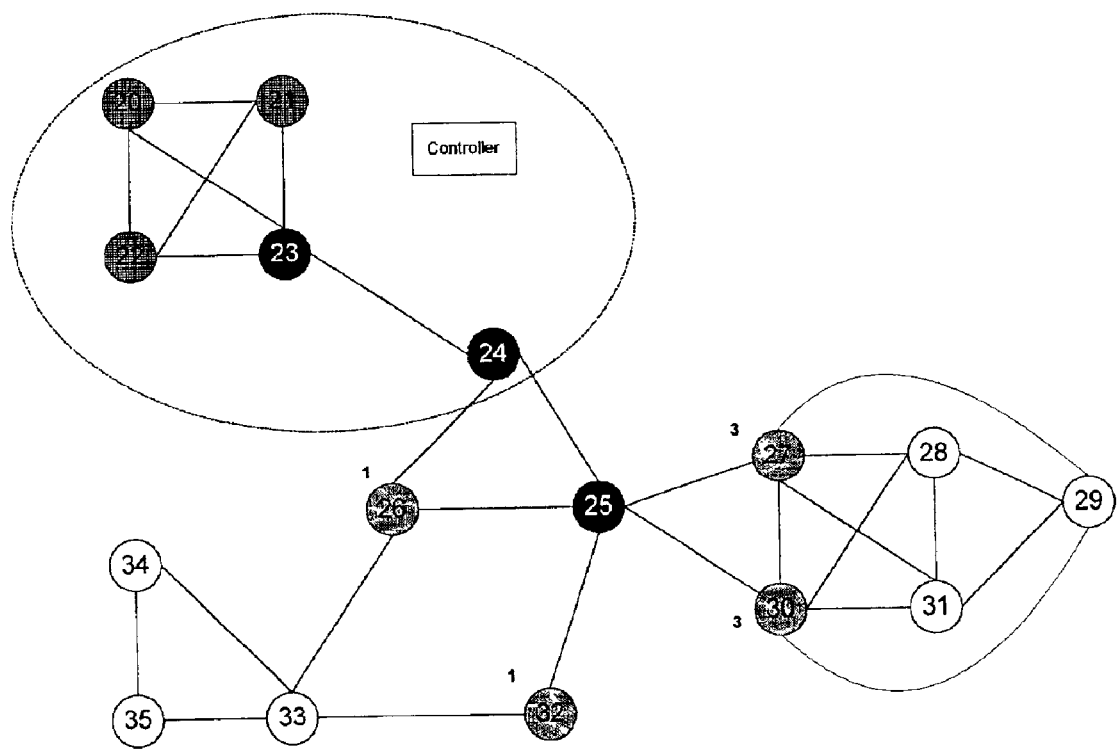

FIG. 8 shows that the device 25, which could reach three new devices, has now been appointed Repeater. Two of those three devices, namely 27 and 30, can each reach three new devices and one, namely 32, can reach one new device.

Figure 9:
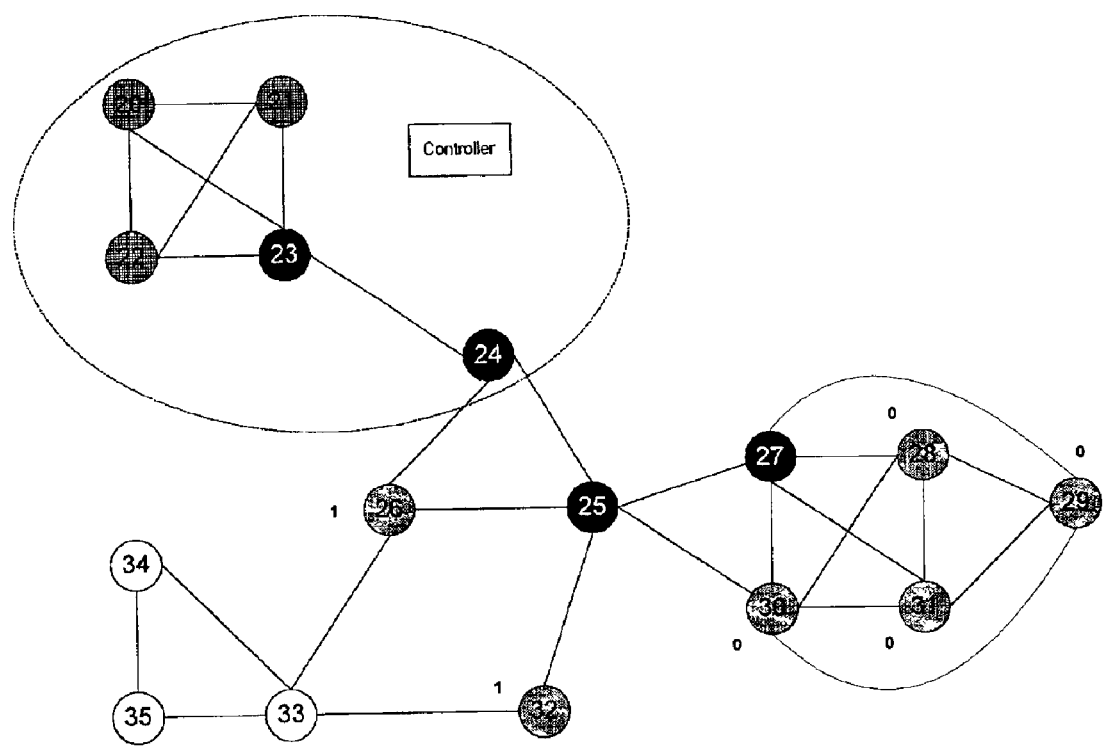

FIG. 9 shows that of the two devices 27 and 30, which could reach the same 3 new devices, one (27) is randomly appointed Repeater. It can be seen that the four devices, 28, 29, 30 and 31, cannot reach any new devices while the two devices 26 and 32 each can reach one new device.

Figure 10:
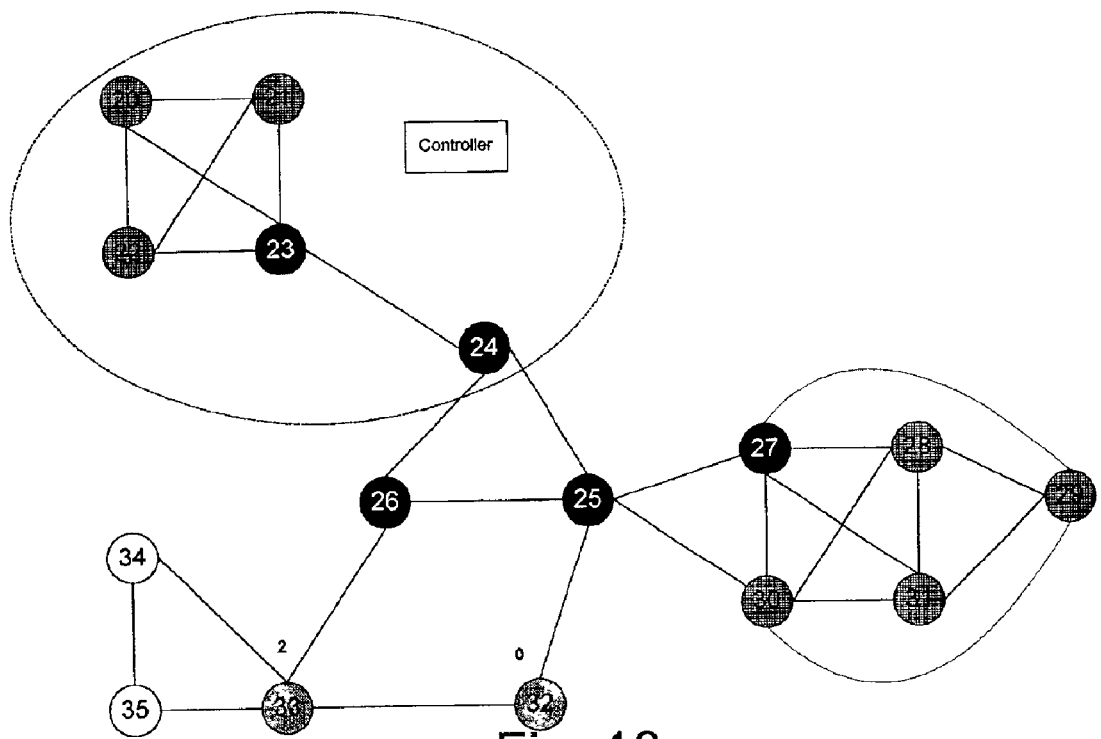

FIG. 10 shows that device 26 is randomly appointed Repeater. There are now two potential repeaters, one (device 32) which cannot reach any new devices and one (device 33) which can reach two new devices.

Figure 11:
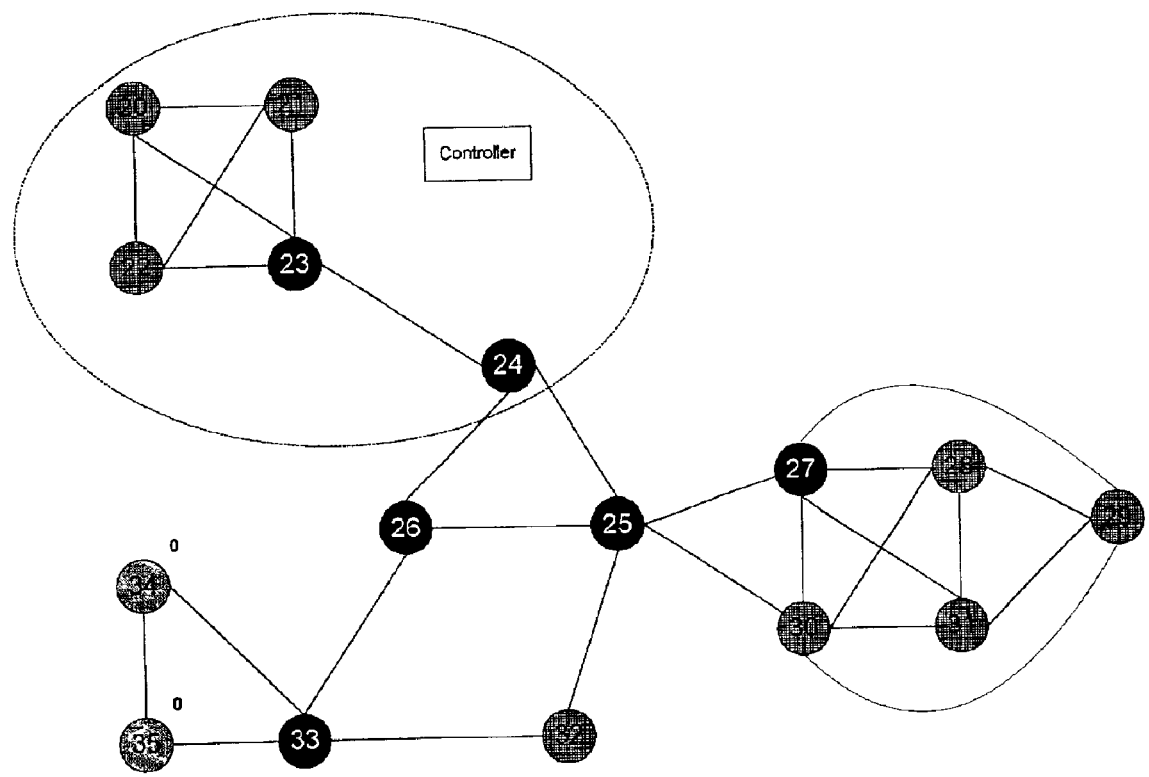

FIG. 11 shows the device 33, which can reach the last two devices 34 and 35, is appointed Repeater.

Figure 12:
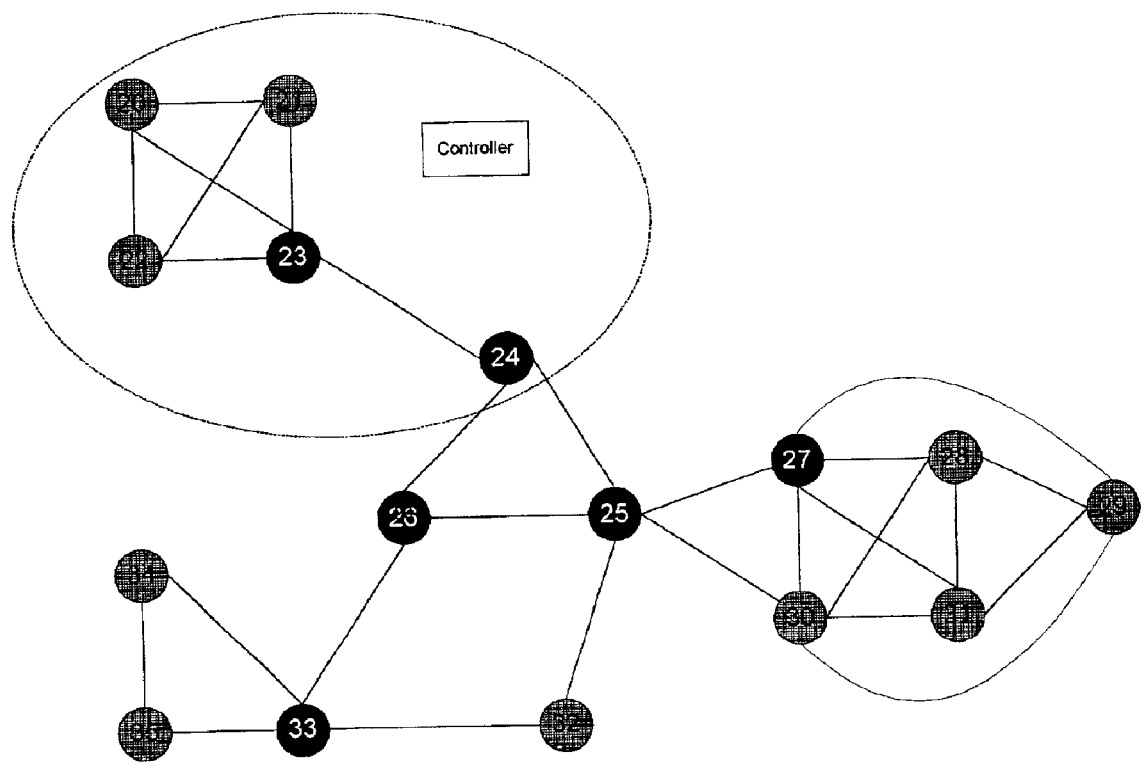

The final configured system with the necessary 6 repeaters is presented in FIG. 12. We have achieved that it is possible to reach any switch from any repeater. It is important to understand that even though a device has been appointed, it still function as a normal input/output device when receiving a signal having its identifier as destination identifier.

Figure 13:
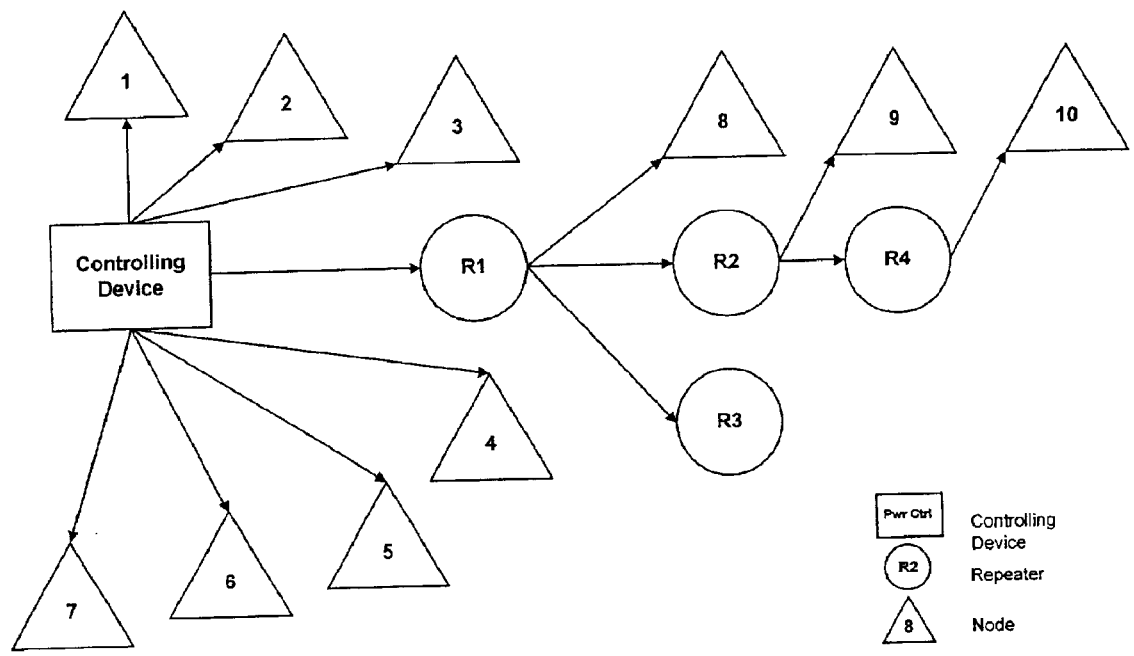
FIGS. 13 through 18 shows a system network with repeaters, the figures illustrates the preferred communication procedure for small capacity controllers according to the first embodiment of the present invention.
Figure 18:
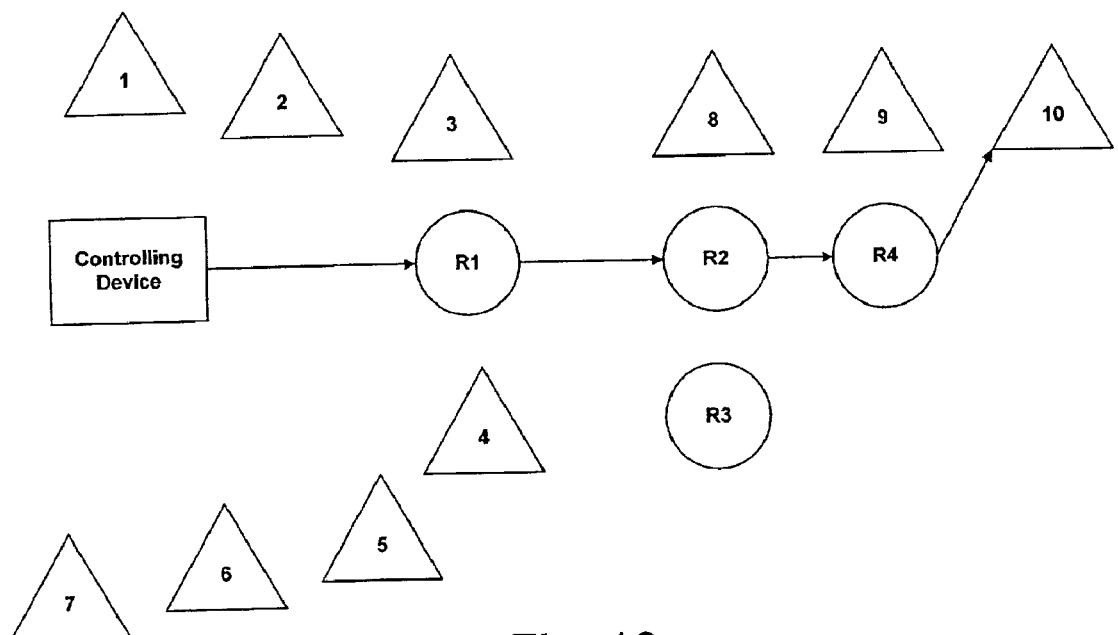

Having appointed repeaters in the system for the current position of the controller, all devices can be addressed using the process outlined in 13 to FIG. 18. The topology of the system is shown in FIG. 13, where circles indicates devices acting as repeater number Rn and the triangles are devices with numbers as indicated. After having performed this process, the controller will know which repeaters to use in order to reach any device in the system.

Figure 17:
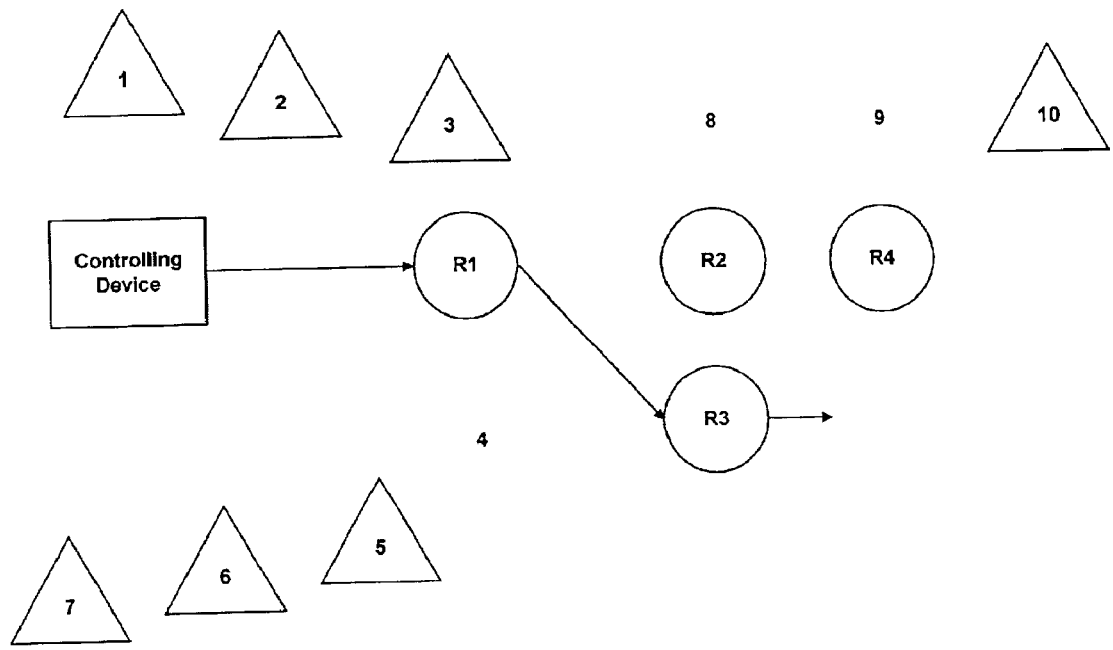

FIG. 17 shows Repeater (R1) asks R3 to forward a multi-address telegram containing the missing device (10) and its command. R3 replies, through R1, that it can not see device 10.

FIG. 18 shows the controller knows that it can communicate with Repeater (R4) via Repeater (R1 and R2). It then asks R4 to forward a multi-address telegram containing the missing device (10) and its command. R4 replies, through R2 and R1, that it can reach device 10.

Now, the controller will know which repeaters to use in order to reach any device in the system, and can generate a frame of frame type 7 as shown in Table 9, comprising the correct repeater identifiers for the repeaters to reach a given destination device.

Routing Table

As an alternative to the above approach used to appoint and address devices as repeaters, the automated repeater detection process described in relation to FIG. 4 to FIG. 12 can be used to build a routing table or a topology table from which a route of repeaters to reach a given device can be extracted. In the table, a "1" designates, that the device of the column can be used to repeat a signal addressed to the device of the row. A "0" designates that the corresponding devices can not reach each other directly. In the topology of the system shown in FIG. 4 to FIG. 12, the routing table is:

TABLE 10

|    | 20 | 21 | 22 | 23 | 24 | 25 | 26 | 27 | 28 | 29 | 30 | 31 | 32 | 33 | 34 | 35 |
|----|----|----|----|----|----|----|----|----|----|----|----|----|----|----|----|----|
| 20 | 0  | 1  | 1  | 1  | 0  | 0  | 0  | 0  | 0  | 0  | 0  | 0  | 0  | 0  | 0  | 0  |
| 21 | 1  | 0  | 1  | 1  | 0  | 0  | 0  | 0  | 0  | 0  | 0  | 0  | 0  | 0  | 0  | 0  |
| 22 | 1  | 1  | 0  | 1  | 0  | 0  | 0  | 0  | 0  | 0  | 0  | 0  | 0  | 0  | 0  | 0  |
| 23 | 1  | 1  | 1  | 0  | 1  | 0  | 0  | 0  | 0  | 0  | 0  | 0  | 0  | 0  | 0  | 0  |
| 24 | 0  | 0  | 0  | 1  | 0  | 1  | 1  | 0  | 0  | 0  | 0  | 0  | 0  | 0  | 0  | 0  |
| 25 | 0  | 0  | 0  | 0  | 1  | 0  | 1  | 1  | 0  | 0  | 1  | 0  | 1  | 0  | 0  | 0  |
| 26 | 0  | 0  | 0  | 0  | 1  | 1  | 0  | 0  | 0  | 0  | 0  | 0  | 0  | 1  | 0  | 0  |
| 27 | 0  | 0  | 0  | 0  | 0  | 1  | 0  | 0  | 1  | 0  | 1  | 1  | 0  | 0  | 0  | 0  |
| 28 | 0  | 0  | 0  | 0  | 0  | 0  | 0  | 1  | 0  | 1  | 1  | 1  | 0  | 0  | 0  | 0  |
| 29 | 0  | 0  | 0  | 0  | 0  | 0  | 0  | 0  | 1  | 0  | 0  | 1  | 0  | 0  | 0  | 0  |
| 30 | 0  | 0  | 0  | 0  | 0  | 1  | 0  | 1  | 1  | 0  | 0  | 1  | 0  | 0  | 0  | 0  |
| 31 | 0  | 0  | 0  | 0  | 0  | 0  | 0  | 1  | 1  | 1  | 1  | 0  | 0  | 0  | 0  | 0  |
| 32 | 0  | 0  | 0  | 0  | 0  | 1  | 0  | 0  | 0  | 0  | 0  | 0  | 0  | 1  | 0  | 0  |
| 33 | 0  | 0  | 0  | 0  | 0  | 0  | 1  | 0  | 0  | 0  | 0  | 0  | 1  | 0  | 1  | 1  |
| 34 | 0  | 0  | 0  | 0  | 0  | 0  | 0  | 0  | 0  | 0  | 0  | 0  | 0  | 1  | 0  | 1  |
| 35 | 0  | 0  | 0  | 0  | 0  | 0  | 0  | 0  | 0  | 0  | 0  | 0  | 0  | 1  | 1  | 0  |

Figure 14:
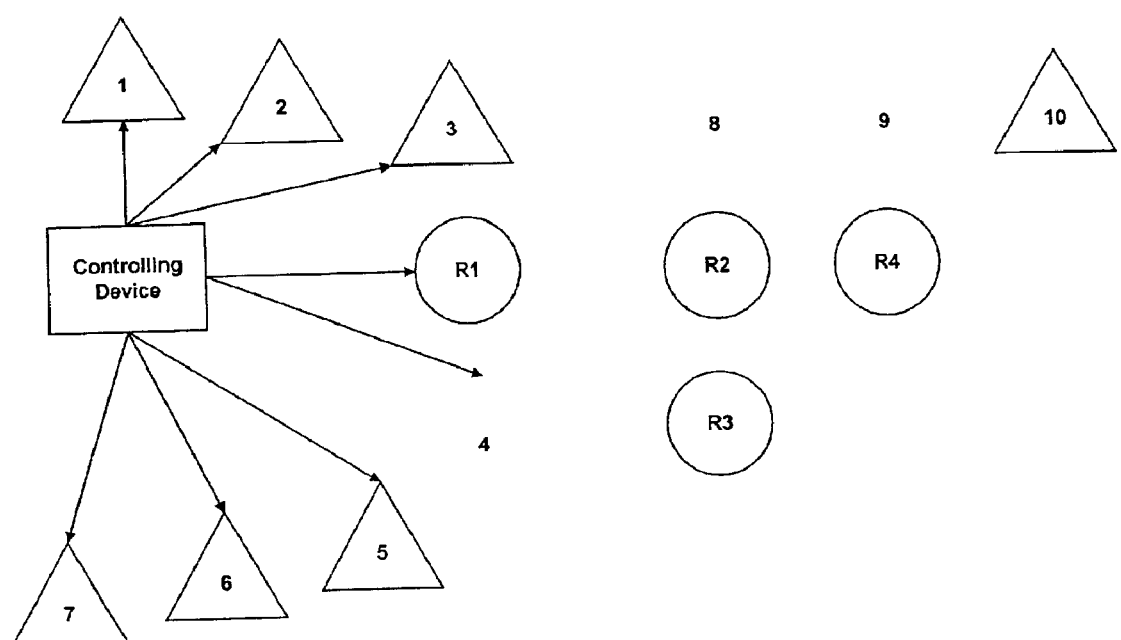

FIG. 14 shows that at first, the controller finds out which of the devices and Repeaters it can address directly by sending a multi-address telegram containing a list of all devices and Repeaters in the system. Time slices are allocated so that all devices have time to acknowledge the command to the controller. Which time slice each single device can apply depends on the location of the device on the list.

Figure 15:
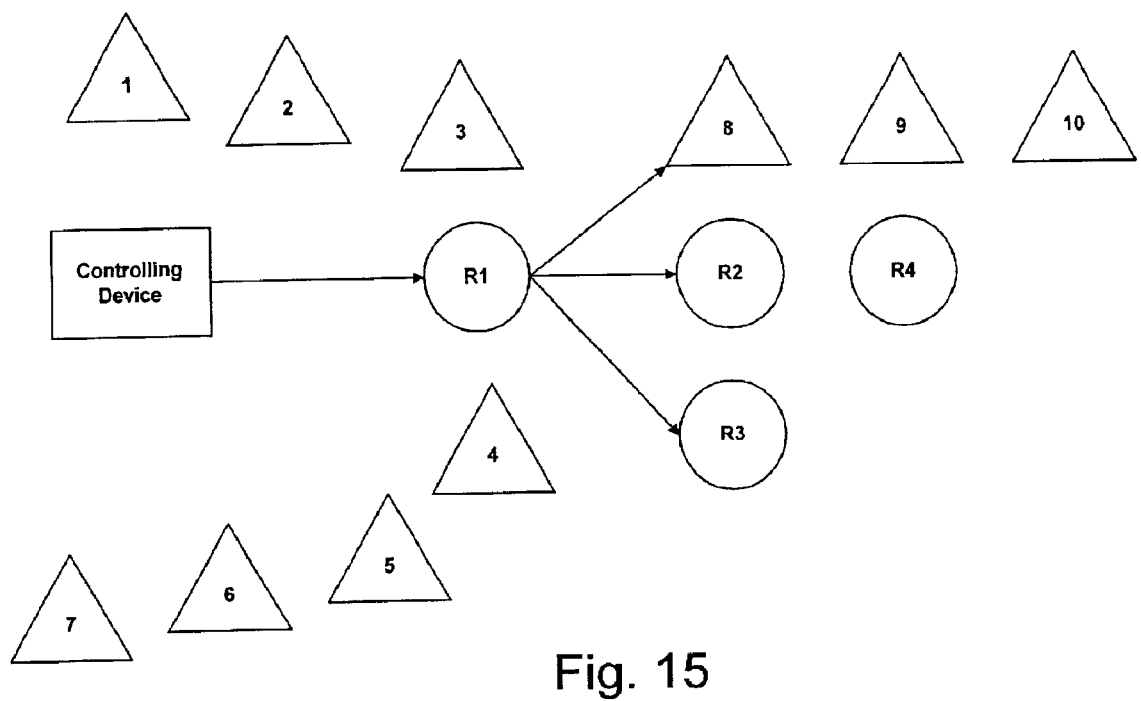

FIG. 15 shows that the controller have received acknowledgement replies and thereby knows that it can communicate with devices 1–7 and Repeater 1 (R1). It then asks R1 to forward a multi-address telegram containing a list of the missing devices (8–10) and their command. It also sends a list of all non-used Repeaters (R2–R4). It reaches devices (8) and Repeaters (R2 R3).

Figure 16:
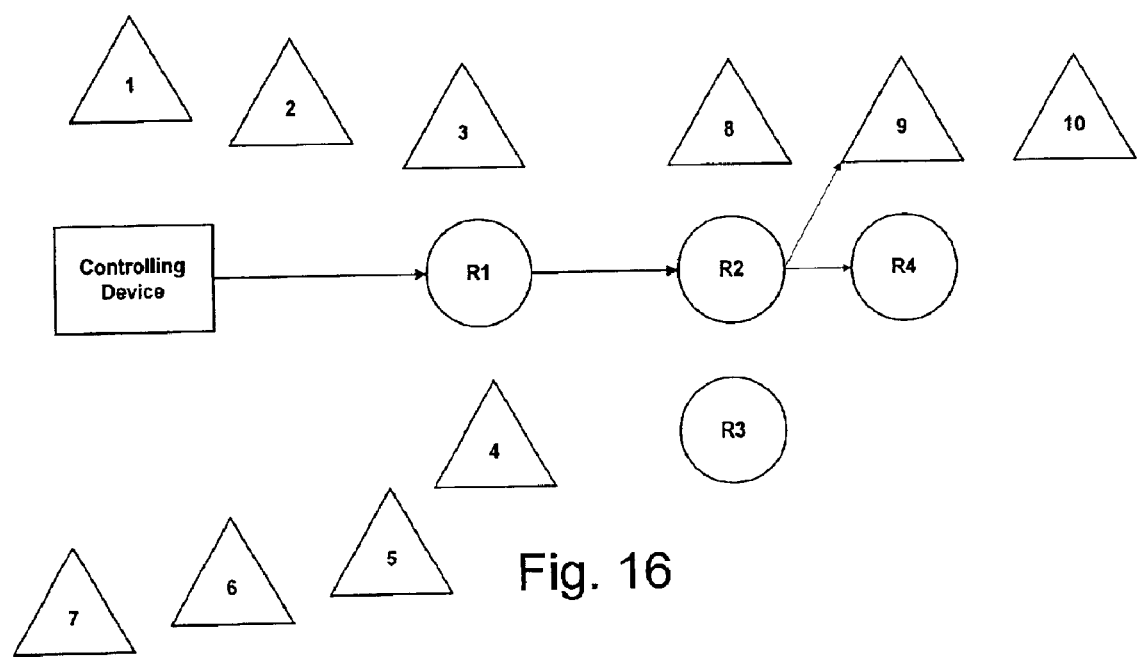

FIG. 16 shows that the controller now knows that it can communicate with Repeater (R2) via Repeater (R1). It then asks R2 to send a multi-address telegram containing a list of the missing devices (9–10) and their command. It also sends a list of all non-used Repeaters (R2–R4). It finds devices (9) and Repeaters (R4).

In this alternative approach, the following method is used to determine which devices to assign as repeaters in a frame of frame type 7 as shown in Table 9.

1. Send signal directly to destination device and wait for acknowledge.
2. If no acknowledge is received, find the first device having a "1" in the row of the destination device in the routing table, include the identifier of this device as a repeater identifier in the signal and transmit signal again.
3. If no acknowledge is received, repeat step 2 for the next devices having a "1" in the row of the destination device in the routing table.
4. If no acknowledge is received, find the first device having a "1" in the row of the repeater device of step 2 in the routing table, include the identifier of this device and the repeater device of step 2 as a repeater identifiers in the signal and transmit signal again.
5. If no acknowledge is received, repeat step 5 for the next devices having a "1" in the row of the repeater device of step 2 in the routing table.

6. If no acknowledge is received, repeat step 5 for the first repeater device from step 3.
7. etc.

The user interface administers setup of the system by the user, and hence allows for the user to perform functions such as learning of new devices, setup of groups and moods, updating shared information between controllers etc, some of which will be described in the following these functions are performed by programs or routines stored in the processor of the controller.

Controller Replication/Update

Since a device shall respond to all controllers in a household, all controllers are programmed with the Home ID (i.e. the unique identifier of the first controller utilized to program a device). Also, some functions, groups, moods or other tables in the system may be "universal" in the sense that it is preferable to have the same tables on all controllers in the system, even though they are originally learned on one specific controller. This is possible in the system of the present invention, since controllers, whether new or already in use, can learn from another in order to share information such as in copying of information from one controller to another or updating changes performed in the shared information of one controller.

This is done by putting the first controller in "Teach Mode" and the second controllers in "Learning mode" and starting the transfer on the transmitting first controller. It is possible to make the memory of the learning controller a complete copy/replication of the corresponding memory of the teaching controller. Also, the learning controller can be updated with data from the first controller, typically only the home ID, the device table, and the routing table, in order to learn the controller of the new devices introduced in the system.

The transfer of data is performed in a sequence of signals having frame type 1 (see Table 2) since it addresses only a single device, the learning controller. The command type (see Table 3) of the first signal determines which type of learning, complete copy (command 21) or updating (command 20), is to take place. In the following signals, the Home ID, device ID table, group table etc is transferred using the command types 22–26 of Table 3. A typical frame, transfer of device ID table comprising three devices, is:

TABLE 11

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| Home ID (Low word) ||||||||||||||||
| Home ID (High word) ||||||||||||||||
| Version || Dir || 0001, Type 1 ||||| Source ID |||||||
| Command 23 ||||||| Length (bytes, ex. Checksum) |||||||||
| Device ID # 1 ||||||| Device ID # 0 |||||||||
| Checksum ||||||| Device ID # 2 |||||||||

It is possible to mask the command values in case of transfer of larger tables such as the routing table.

Learning of New Devices

The system is very flexible and additional devices can easily be added as time goes by. When a new device is added to the system it has to know which Home ID and individual Device ID to use. This procedure requires only three actions by the user, using only the device to be installed and any one controller. Everything else is taken care of by the system, and does not involve or affect any other controller or device in the system. In the first preferred embodiment, the system learns the presence of the new device and assigns a Device ID in an automated process following the process steps:
1. The user sets the controller in a learning programming state where it listens to all signals, not only to those with the correct home ID.
2. The user presses and holds a button on the device.
3. The device sends request for Home ID and Device ID to listening controller as mentioned in 1.
4. Device awaits frame with Home ID and Device ID from controller.
5. Controller looks up next available Device ID and sends Home ID and allocated Device ID to device.
6. Device stores the received Home ID and Device ID in non-volatile memory.
7. The new device is added in the device table, and may be added in the group table and may be named.

The signal for assigning the device (or controller) ID to a new device (or controller) has frame type 1 (see Table 2) since it addresses only a single device. The commands used are command 27 (assigning device ID) and command 28 (assigning controller ID), a typical frame, assigning device ID is:

TABLE 12

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| Home ID (Low word) ||||||||||||||||
| Home ID (High word) ||||||||||||||||
| Version || Dir || 0001, Type 1 ||||| Source ID |||||||
| Command 27 ||||||| Length (bytes, ex. Checksum) |||||||||
| Checksum ||||||| Device ID # |||||||||

In the alternative where the device is programmed with a unique Device ID from factory, the process will be somewhat simpler:
1. The user sets the controller in device programming state, and is requested to specify which group the new device should be placed in.
2. The user presses and holds a button on the device whereby the device sends its Device ID to listening controller as mentioned in 1.
3. Device awaits frame with Home ID from controller.
4. Controller sends Home ID to device.
5. Device stores the received Home ID in non-volatile memory.
6. The group table in non-volatile memory on the controller is updated with the new Device ID.

The simplicity of this procedure is due to the unique addresses of all devices in the system. Since all devices can be addressed individually and due to the functionality of the protocol, each device can be set up and included/excluded individually.

If the device is already within the device table of the controller, but have to be added to a new or existing group, the procedure comprises the following steps:
1. The user sets the controller in group programming state and the user is requested to specify which group the new device should be placed in.
2. The user presses and holds a button on the device.
3. The device sends its Device ID to listening controller.

4. Controller stores the received Device ID in the selected group table.

If the controller has large capacity and is capable of building and administering topology maps, the procedure may be carried out differently, e.g. by simply installing the device physically and thereafter positioning a new device on the corresponding position in the topology map on the controller. The system may now itself find which (existing or new) repeaters should be used to communicate with the new device and may itself prepare the device for receiving Home and Device ID.

The learning processes outlined above may be organized differently, however it is important for the overall functionality of the system that the device and the controller themselves (assign and) learn each other's ID's. Devices can belong to several groups, and a single device is inserted in a group by adding its Device ID to the relevant group table in the controller memory, hence without influence for any other devices at any time.

Data Structure in Controller

In order to keep the signals as short and few, the system according to the first preferred embodiment is optimized to operate as simple as possible without loosing quality in terms of reliability, range/coverage, versatility, and flexibility. In the following, the data structure of the controller, which allows for sharing information and performing functions in the most appropriate and efficient manner, is described.

Device Table

This table holds information on all the devices, which are currently installed in the complete system. This table is also used to assign device identifiers to new devices in the system. This table may also contain information about the characteristics or fixed settings of the different devices. This table can also holds information related to the childproof function such as the code.

Group Table

This table holds information on which devices from the Device Table that are grouped together in which group. This table also holds information on the current setting of the specific group.

Mood Table

The Mood Table holds information on which groups and devices are members of the specific Mood and it also holds the specific settings of each device in the mood.

Group and Mood Name Tables

These two tables contain the user-defined alphanumerical names for the different groups and moods.

Controller Table

This table holds information on all controllers presently in the system, and optionally also the date and time of the last learning from another controller. This table could also contain information about the characteristics of the different controllers.

Repeater Table

This table holds information on (the identifiers of) all devices which act as repeaters, and information of which devices can be reached by each repeater.

Topology Map Table

This table holds information of all the known devices in the system and their location in system. This table also contains information of the individual devices such as alphanumerical names, characteristics and their current settings.

In the alternative approach described earlier, a routing table, such as Table 10 can replace the repeater table and the Topology map.

Trigger Action Table

This table holds information about which actions to take when a trigger level on one or more of the input devices has been reached.

Event Table

This table is similar to the Trigger Action Table. It holds certain events in the form of small programs, which is executed when predetermined conditions are fulfilled. Examples are turning on the coffee machine or car heater when a certain time has been read from the timer.

Program Table

This table holds large programs, macros or routines to be executed on command.

The system according to the first preferred embodiment can be used in a broad variety of locations to control a broad variety of functions. The system can be installed in private homes, hotels, conference centers, industrial offices, storehouses, various institutions such as kinder gardens, schools, old people's home, disabled person's home etc. In the following, examples of build-in functions in the system of the first preferred embodiment are described.

Child Protection Function

One of the functions is the Child Protection Function. This allows the user to restrict the use of one or more devices by use of a code or an action. The restriction can have several effects, i.e.:

The device or the appliance connected thereto are turned off and can not be turned on until a valid code has been entered or a predetermined action has been performed. In the first preferred embodiment, pressing an actuator on the respective device three times annuls the protection. E.g. utilized to protect children towards household appliances such as ovens, toasters, and hotplates.

The device or the appliance connected thereto can only operate at a specified level, for a specified period of time, or within a specified time period unless a valid code has been specified. E.g. used to restrict the output level of the Audio equipment, restrict the amount of children's TV watching when the parents are out, or restrict the solarium working periods to those actually paid for by the customer.

The status or operation level of the device or the appliance connected thereto can not be altered until a valid code has been specified. E.g. utilized to fix the hot water temperature at a constant temperature or fix the thermostat for the air-conditioning.

Timer

Each controller can comprise a clock giving the date and time. This clock is used for timer functions such as for performing preprogrammed events and a time value can be read by different parts of programs comprised in the controller.

Power and Lighting

In a second preferred embodiment, also referred to as Power & Lighting control, the system comprises a set of products for controlling the power level to electric appliances connected to the devices, such as lamps, air conditioning, and kitchen appliances.

Apart from being a Power & Lighting control system, the system of the second preferred embodiment is to form a base for a complete home control system including other subsystems such as HVAC control, alarm system control, access control, etc.

The automation system of the second preferred embodiment is built on the same platform as the automation system of the first preferred embodiment. Thus, the description of the second preferred embodiment is a more detailed description of several of the functions described in relation to the first preferred embodiment, and it is assumed that the features described in relation to the first embodiment are also valid in the second embodiment.

Figure 24:
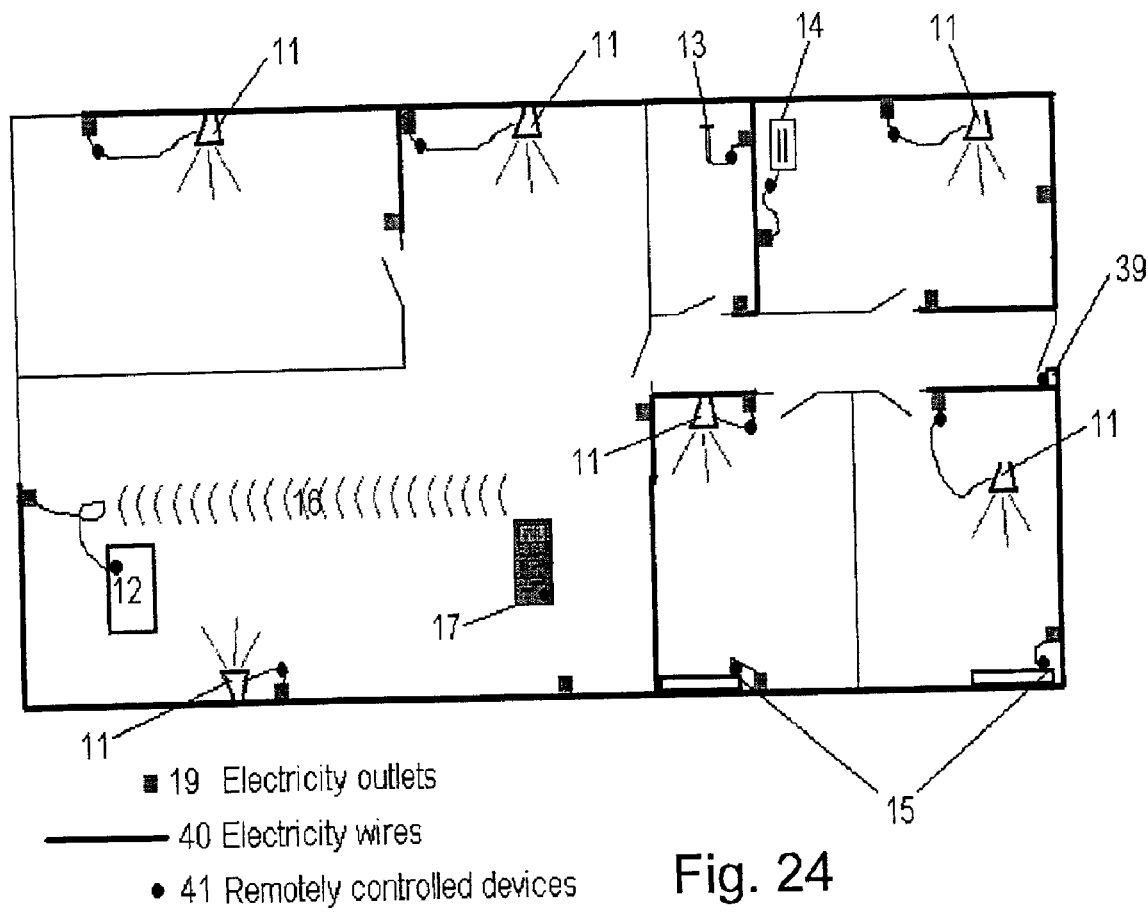
FIG. 24 illustrates an implementation of a system according to the second preferred embodiment of the present invention.

FIG. 24 shows an implementation of a system according to the preferred embodiment. FIG. 24 shows a ground plan of a house 18 with several rooms. The house has an inlaid electricity grid consisting of conducting wires 40 (thick lines) leading to a number of electricity outlets 19 (gray squares). This compares to the electricity net for a typical building. A number of different electric appliances connected to electricity outlets are positioned around the house, these are lamps 11, TV set 12, shaver 13, toaster 14, and thermostat 15 for radiator. Each appliance is connected to a device 41, which can be remotely controlled by a controller 17 through RF signals 16.

The devices 41 can be connected between the appliance and the electricity outlet 19 such as in the case of the toaster 14, or be an integrated part of the appliances as in the case of the TV set 12. Thereby controlling the device connected thereto can control the power supply to and/or the function of an appliance. Examples of this controlling is turning the lamps 11 on/off, change the operation status such as the channel of the TV set, setting another temperature on the thermostat 15 or activating the burglar alarm 39. Also, a device can report to the controller with a status of an appliance, such as the temperature in the room of the thermostat 15 or the status of the alarm 39.

In the embodiment described in relation to FIG. 24, a mood can comprise all devices connected to lamps 11 in the living room and the settings could be the amount of power supplied to the lamp by each device. By selecting this mood, all lamps in the living room would be dimmed to a predetermined level creating desired lighting. In another example, the mood comprises all thermostats 15 in the house and the settings are the desired room temperatures in each room. Hence by selecting the mood, a predetermined temperature set-up can be set around the house.

The following description of the Power & Lighting control system mainly deals with those aspects not comprised in the high-level description of general parts of the conceptual, scaleable system given in the description of the first preferred embodiment of the automation system. However, details and features described only in relation to the second embodiment are also valid with respect to the first preferred embodiment.

The Power & Lighting control system consists of the following elements.

Controllers

In the Power & Lighting embodiment, the controller is a mobile control panel such as a remote control, so that the use or programming of the system is not restricted to certain locations. Controllers have a display such as an LCD (Liquid Crystal Display) display. The controllers can optionally interface with a computer; moreover, a computer may also act as a controller in the system. The initial implementation and often also later setting of a device is carried out in the vicinity of the device. Although the data protocols makes use of addressing of devices using device identifier's, the person performing the programming can rely on his/her visual confirmation of the connection of an appliance to a given device. Hence the programming interface does not rely on the users ability to remember device codes, assigned numbers or alike.

Figure 19:
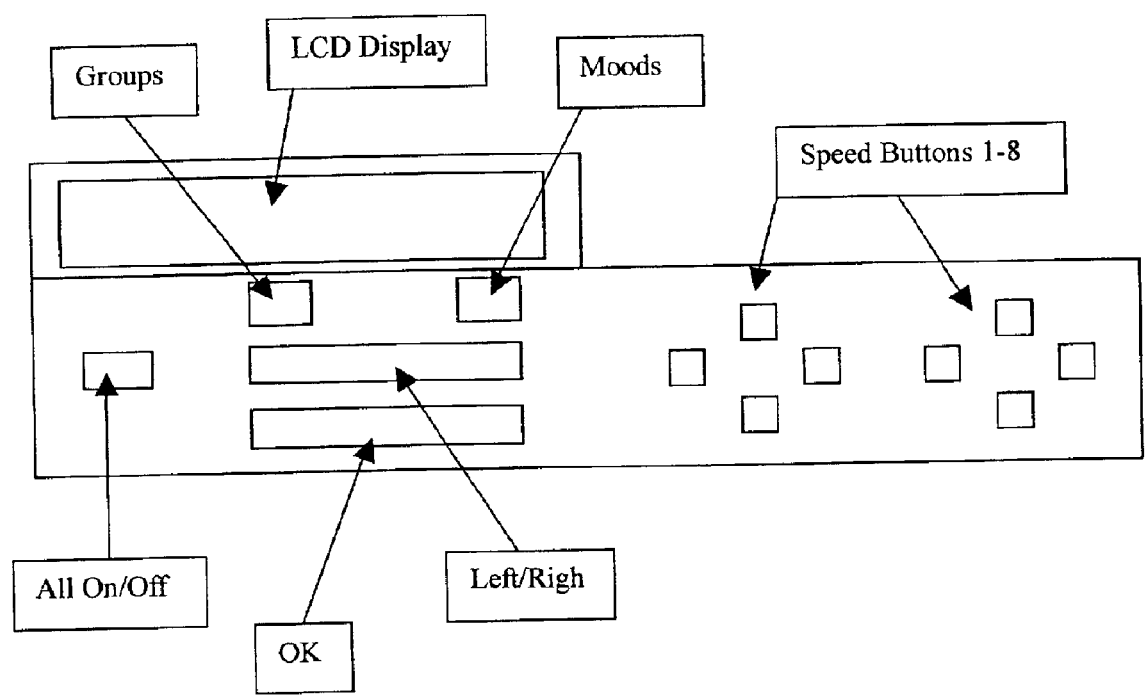
FIG. 19 shows a controller according to a second preferred embodiment of the invention.

FIG. 19 outlines a controller according to the second preferred embodiment. The controller has the following buttons:

The all On/Off button which will either switch all output devices On or Off except for those device that have been configured not to be included. The set-up of this function is specified later.

The eight speed buttons for quick access to the most commonly used groups or moods.

The Group button which sets the state of the speed buttons to be groups

The Mood button which sets the state of the speed buttons to be moods

The OK button which is mainly used within the menu system.

The Left and Right buttons which among other things are used to maneuver in the menu system.

Among other things, the following actions can be performed with the controller:

Programming devices to belong to the system (i.e. programming them with the unique Home ID number)

Assigning identifiers to new devices.

Programming devices to belong to one or several groups

Executing the on/off function on a given group

Executing the dim function on a given group

Programming devices to belong to one or several moods

Executing a given mood

Naming a given group with alphanumerical characters

Naming a given mood with alphanumerical characters

Setting a child protection on a device

Programming the timer

Initiating and interrupting the keylock function

Etc.

Several controllers can be utilized within a system, and signals from a first to a second controller can be related to:

Learning of Home ID and assigning of controller ID.

Replication or updating of various data on controllers.

Output Devices

The output devices are operationally connected between a power source and an electric appliance, typically in the form of an outlet socket connected to the power supply socket. The output devices can perform switching, dimming and optionally metering of power or current delivered to the electric appliance. Also, the output devices are able to perform as repeaters in the system.

A number of different types of output devices are feasible, ranging from low voltage switches to HVAC output devices etc. Each output device has only one actuator button. This button is used every time the device should notify a controller of its Device ID during programming procedures. The button can also be used to turn on/off and dim the output power supplied by the device without the use of a controller. However, this function can be overruled by the child protection function by making the button inactive for power adjustment purposes. The different functions of the button are utilized by pressing the button for different periods of time, e.g. a short period for turning on/off and dimming up/down when the button is pressed continuously.

Among other things, the output devices can perform the following actions:

Inform a controller of its presence and get ready to receive the Home ID and Device ID.

Toggle the current on/off by use of a button on the device

Dim the current by use of a button on the device

Execute commands received from a controller
> Dim the current
> Repeat the command received to other output devices
> Toggle the current On/Off
> Acknowledgement of received and executed commands
> Reply with device status Meter the power or current supplied to the electric appliance connected to the output device, and save, process and transmit the metered information.

The following paragraphs describe some of the functionality comprised in the Lighting system.

Group or Mood Switching

By pressing "Group Button" the user enters functions dealing with a single or a group of appliances such as lamps. By pressing "Mood Button" the user enters functions dealing with moods (e.g. setting a predefined Lighting for the room).

Group On/Off Setting

A user can turn on or off a single or a group of appliances by either using the speed buttons 1–8 or by using the scroll button. If the user uses button 1–8 then only a short press is required. The button will work as a toggle. If the scroll button is used the user must scroll to the desired group and press an OK button.

Group Dim Setting

A user can dim the current to a single or a group of appliances such as lamps (the same group as the on/off function) by either using the speed buttons 1–8 or by using the scroll button. If buttons 1–8 is used, the dimming will be activated when the button is pressed continuously. When the correct dimming level is reached the button is released. If the scroll button is used the user must scroll to the desired group and press additional buttons to dim up/down.

Command Acknowledgement on Display

Each command initiated by the user will be acknowledged through the display. A typical acknowledgement could for example be that "all lights are now off." Upon activating a device, the control panel expects an acknowledgement receipt from the device that the command has been carried out. Two events can occur:

> The device does not respond with an acknowledgement:
>> The controller indicates e.g. "out of reach or device defect"
> The device responds with an error message such as No Current Detected In Mains:
>> The controller indicates e.g. "Bulb or lamp defect"
> The device responds with Command Executed:
>> The controller indicates e.g. "All OK"

Mood Programming Function

Moods can be programmed into the control panel by pre-setting the different devices to the desired current level, and afterwards storing this level in the control panel. Moods can be stored in buttons 1–8 or by using the scroll button for additional storage.

Mood Setting Function

A user can activate pre-set moods (e.g. TV watching or working mood) by using the control panel's 1–8 buttons. If the scroll button is used the user must scroll to the desired group and press an OK button.

All On/Off Setting

A user can turn on or off all switches by pressing the "all on/off" button. A device will per default be programmed to respond to the "all on/off" button, but can also be programmed not to.

All On/Off Programming

Should a user require that a certain device should not respond to "all on/off" it can be done so by setting this on the control panel. This could e.g. be beneficial for the fish tank or the outdoor lights.

Random On/Off Setting

The user can use the control panel to set a device to random turn on and off (i.e. used to keep away burglars). The device will keep turning on and off with e.g. 3 hrs. interval and abort this action next time it receives any instruction from the control panel. The time interval in which the control panel should randomly switch on and off can also be set (e.g. from 18:00 to 23:00)

Random On/Off Programming

Should a user require that a certain device should not respond to "random on/off" it can be done so by setting this on the control panel. This could e.g. be beneficial for the fish tank or the outdoor lights.

Device Resetting

All devices can be reset whereby the Home ID and the Device ID held by the device is deleted and all references to the Device ID in the controller is deleted. In the Power & Lighting embodiment, the resetting is carried out by setting the controller in "device reset" mode and pressing the actuator button on the device. This makes the device transmit information to the controller, which then perform the resetting.

Programming and Learning

Figure 20:
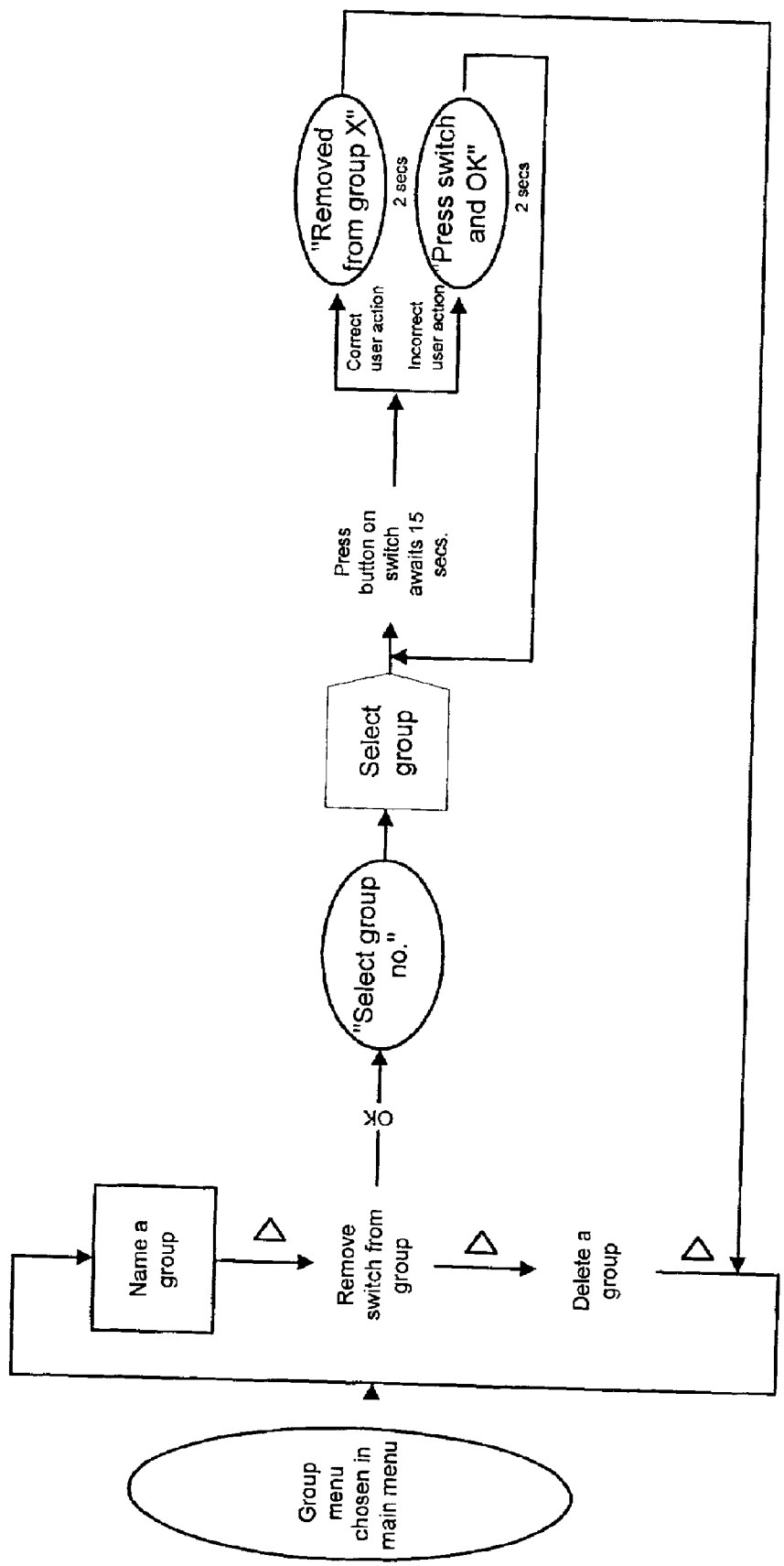
FIG. 20 is a flow diagram showing the procedure for removing a device from a group on the controller according to the second embodiment of the present invention.
Figure 21:
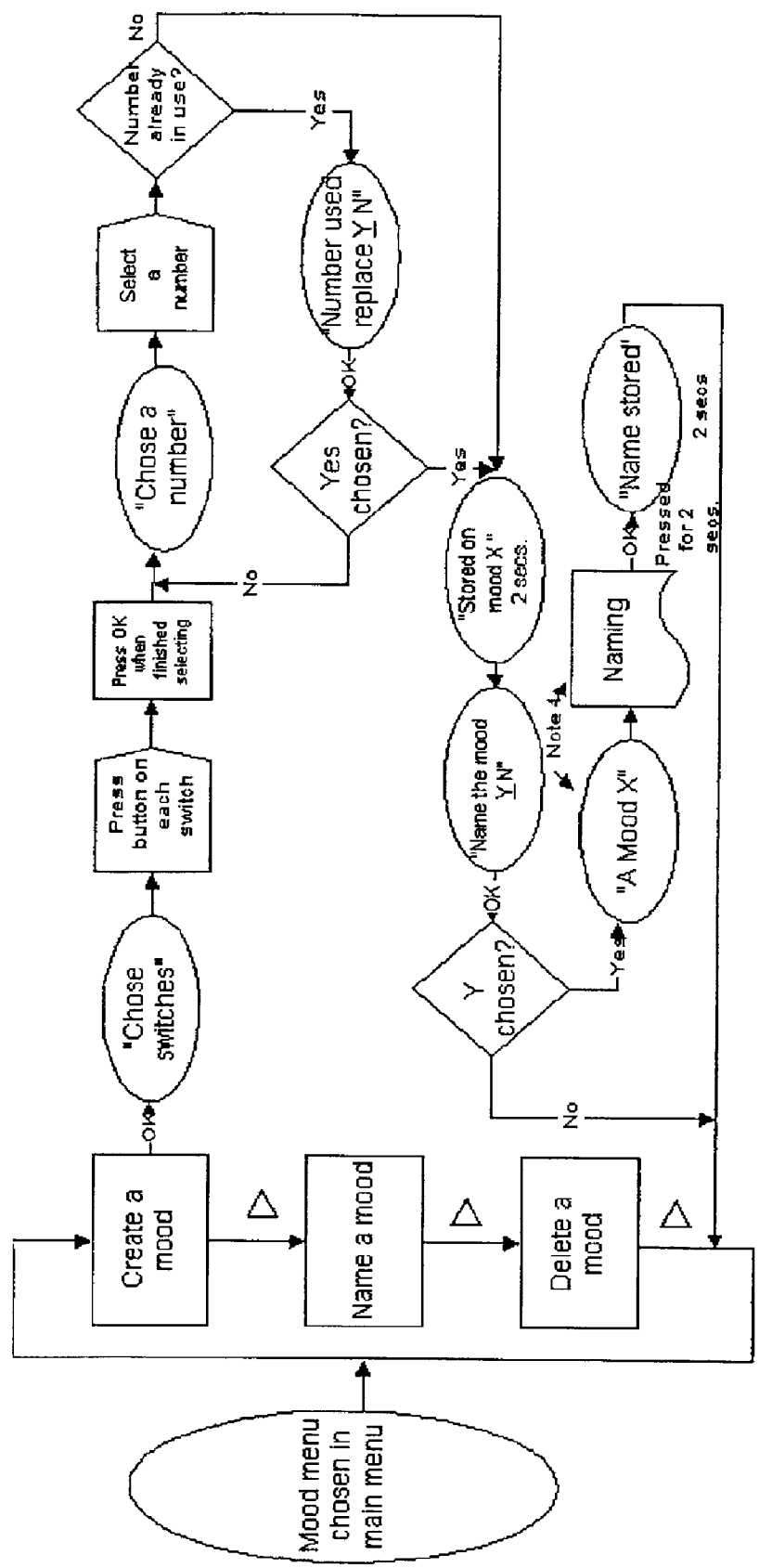
FIG. 21 is a flow diagram showing the procedure for creating a mood on the controller according to the second embodiment of the present invention.
Figure 22:
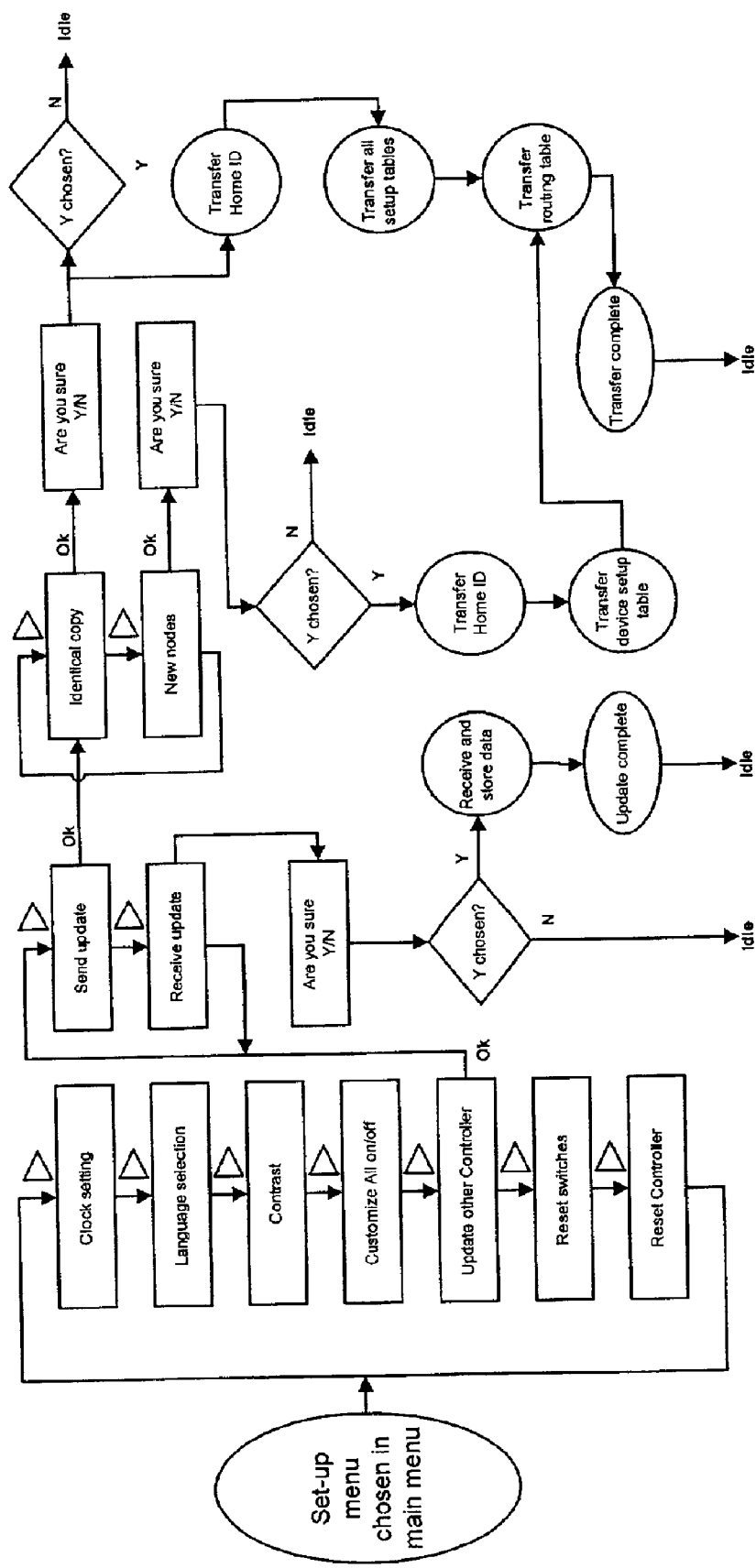
FIG. 22 is a flow diagram showing the procedure for learning of a controller according to the second embodiment of the present invention.

In the following, the procedures for performing some of the programming and learning functions within the systems are outlined with reference to FIGS. 20 to 22. In the user interface the choices are presented as menus on the LCD display of the controller, and can be selected using buttons under the display.

Group Menu

When selecting the group menu on the main menu, the following three things can be done to the groups after they have been created such as during addition of new devices.

> Name the group: Each group can be named with alpha-numerical numbers to improve the user friendliness.
> Remove a switch from a group: When the different devices have been added to a specific group then this menu functionality enables the user to remove individual switches from a specific group. The procedure of how this is done is shown in FIG. 20. First the user selects the "Remove Switch from Group" menu option and is prompted for the group number in which the device is to be removed. Then the user has to press a button on the output device in order for controller to get the device id to remove. When the button on the output device has been pressed to specific device has been removed from the group table and the menu system return to the main menu.
> Delete a group: This menu item allows the user to completely delete a group.

Mood Menu

Moods are groups of devices in which the setting of each device is set to a desired dim level or current. When selecting the mood menu on the main menu, the following options are available in the mood menu section.

> Create a Mood: This menu item allows the user to add devices into a mood. The procedure is outlined in FIG. 21. First the user selects the "create a Mood" menu option and is prompted to select devices to include in the mood. The user then presses a button on all of the output devices which are to be included in the mood and presses OK when done. The output devices then transmit its current dim level to the controller. Then the user is prompted for a mood number to add the already selected devices into. If the mood is already is in use then user has to determine whether to replace the mood with the selected devices or to choose another mood number. The user then has the option to name the mood. The user can now select the alphanumerical characters on a toggle menu using the Left/Right and the OK button. When the name is typed, the user holds the OK button for more than 2 seconds whereby the controller saves the mood name and returns to the main menu.

Name a Mood: Each mood can be named with alphanumerical numbers to improve the user friendliness.

Removed switches from Mood: When the different devices have been added to a specific mood then this menu functionality enables the user to remove individual switches from a specific mood again. The method is equivalent to the method used when removing switches from groups.

Delete a Mood: The menu item allows the user to completely delete a mood.

The all On/Off functionality is per default set to be all devices known by the controller. Individual switches can repeatable be removed or added from this function. There is also a possibility to customize whether the button is to toggle On/Off or only to use this button as a switch off button.

Controller Replication

To ease the use of having several controllers operating within the same Home ID the product has the feature to update each other with the different tables and settings. The updating process is shown in FIG. 22. The user is first prompted for whether the current controller should send data to the other controller or receive data from the other controller. If the user selects receiving data the controller enters a learning-programming mode and will return to the main menu when the updates has been received. If the user selects the option to send data, the user is prompted for whether he/she wants to update the other controller or make an identical copy/replication of current controller. If the update is chosen, only specific data is transmitted. If identical copy/replication is chosen, the Home ID and all tables containing Groups, Moods, etc. is transmitted. When the update or identical copy/replication is completed, the system returns to the main menu.

Hardware

Power Meter

Figure 23:
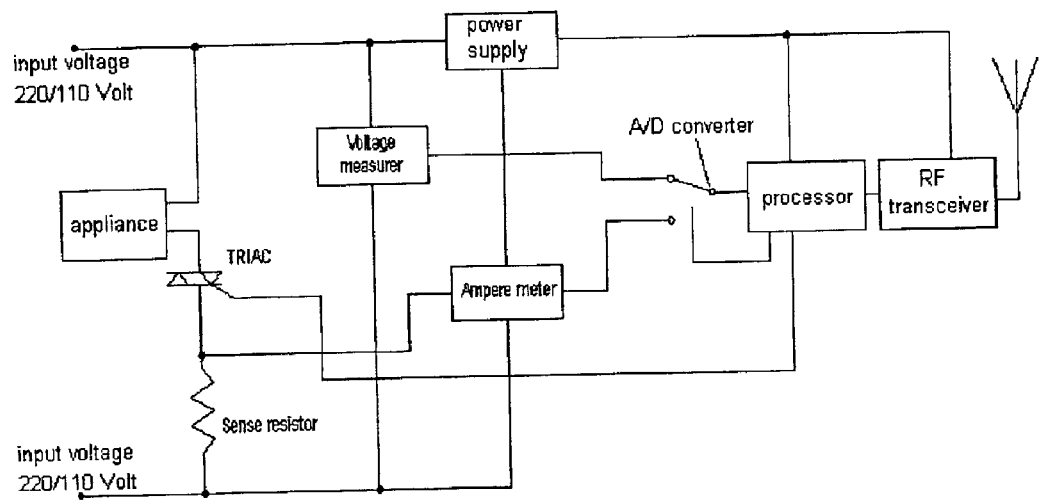
FIG. 23 shows an example of a diagram of an electrical circuit for measuring the power supplied by a device according to the second preferred embodiment of the present invention.

Some or all the output devices can include means for measuring the power supplied to the one or more appliances connected to each device. The power measuring means are means for measuring the current supplied to the appliance at constant voltage, in order to allow for determination of the power, in e.g. KW/h or VoltAmpere/h, received by the one or more appliances connected to the device. A possible way to implement power meter functionality in the existing switches is outlined in FIG. 23. This implementation requires the consuming appliance to pull it's current in a sinus form which would be the case for ordinary lamps. The power meter would then be able to measure volt-amperes, which would be identical to Watts.

This power meter function allows the controller to monitor the power consumption of individual appliances, all appliances in a given group, all appliances in a given mood, and of all appliances connected to the system. Hence, one can practice a total power metering, revealing detailed information of specific appliances or sections in the building. The devices are adapted to sum up the power consumption for a given period of time and to report the power consumption to a controller either in response to a request to do so from the controller, or on its own motion at e.g. a predetermined time or total power consumption.

The controllers and the devices according to the first and/or second embodiment have some common hardware such as:

RF Transceiver with the following characteristics:
  Very flexible frequency band
  Programmable output power
  Data-rate up to 9600 bit/s
  FSK modulation
  Suitable for frequency hopping protocols
  Low power consumption
Microprocessor with the following characteristics:
  High Speed RISC Architecture
  Very Low power consumption
  Integrated RAM, EEPROM and FLASH memory In the second embodiment, the Power & Lighting system, the control panel and the output devices further comprises:

The control panel:
Two line LCD display
13 button soft keypad
Battery holder for three type AAA batteries
Timer chip which is used to show the time and set timers for the burglar deterrent function.

The output devices:
The components on the devices are powered from the 220/110-volt power outlets in the wall after it has been transformed down to 3.3v. The dim and on/off function is controlled by a very powerful TRIAC. The output devices have one actuator button used in programming procedures and to adjust the power supplied by the device.

What is claimed is:

1. An automation system for controlling and monitoring devices comprising:
  a plurality of devices to be controlled, each device comprising:
    a radio frequency receiver for receiving signals,
    a radio frequency transmitter for transmitting signals,
    a processor for administering the reception and transmission of signals,
    a first memory adapted to hold a device identifier identifying the device, and
    means for providing an output to, or receiving an input from, an appliance operationally connected to the device,
  a first controller comprising:
    a radio frequency transmitter for transmitting signals,
    a radio frequency receiver for receiving signals,
    a first memory comprising an organized data structure holding device identifiers of devices controlled by the first controller,
    a second memory holding a controller identifier identifying the first controller, and
    a processor for administering the reception and transmission of signals and being adapted to store one or more device identifiers in the first memory, the processor comprising means for generating a first signal comprising one or more destination identifiers corresponding to device identifiers of one or more destination devices, information related to the operation of the appliances connected to said destination devices, and, if necessary, repeater identifiers corresponding to one or more signal repeating devices,
  wherein one or more of the plurality of devices are adapted to act as signal repeating devices in that the processors of each of said one or more devices comprises means for, upon reception or a first signal, processing said information in its processor if one of the one or more destination identifiers corresponds to the device identifier of the device, and means for, upon reception of a first signal, transmitting a second signal holding at least said destination identifiers and said information if one of the one or more repeater identifiers corresponds to the device identifier of the device, and act as I/O devices in that the processors of each of said one or more devices comprises means for generating an event signal in response to input received from an appliance or user, the event signal comprising one or more destination identifiers corresponding to controller or device identifiers of one or more destination controllers or destination devices.

2. An automation system according to claim 1, wherein all devices are adapted to act as repeating devices.

3. An automation system according to claim 1, wherein the first memory of the first controller comprises a routing table indicating, for each device, other devices which can receive and process a signal transmitted by said device.

4. An automation system according to claim 3, wherein the processor of the first controller comprises means for identifying in the routing table device identifiers of devices for repeating a first signal having a predetermined destination identifier, and to include said device identifiers as repeater identifiers in the first signal.

5. An automation system according to claim 1, wherein one or more of the plurality of devices are further adapted to receive an input from the appliance connected thereto, and wherein the processor of a device is adapted to, in response to the received input, generate and transmit a first signal.

6. An automation system according to claim 5, wherein the received input or data corresponding thereto is comprised in the first signal.

7. An automation system according to claim 5, wherein the received input is stored in the first memory of the device.

8. An automation system according to claim 1, wherein the appliance connected to one or more of the plurality of devices is a sensor selected from the group consisting of electromagnetic radiation sensor, luminosity sensor, moisture sensor, movement sensor, temperature sensor, mechanical actuator contact, sound sensor, pressure sensor, electric signal sensor, smoke detector, audio pattern recognizing means, visual pattern recognizing means and molecular composition analyzing means.

9. An automation system according to claim 8, wherein the sensor measures the impedance, capacitance, resistance, or inductance of an electric signal.

10. An automation system according to claim 1, wherein one or more of the plurality of devices are further adapted to generate an output to the appliance connected thereto in response to a received signal, said output being related to the operational state of the appliance.

11. An automation system according to claim 10, wherein the output is electric power, and wherein a device can adjust the output power at a level according to a setting comprised in the received signal.

12. An automation system according to claim 10, wherein a device is adapted to prohibit the output in response to a received first set of instructions or a first code or predetermined action provided by the user, and wherein said restriction can only be removed in response to a received second set of instructions or a second code or predetermined action provided by the user.

13. An automation system according to claim 12, wherein the first controller is adapted to generate the first and the second set of instructions, and wherein the user is must provide a code or perform a predetermined action in order for the first controller to generate said second set of instructions.

14. A method for establishing an RF automation system network for controlling and monitoring devices, said method comprising the steps of:

providing a first controller comprising:
a radio frequency transmitter for transmitting signals,
a radio frequency receiver for receiving signals,
a first memory comprising an organized data structure holding device identifiers of devices controlled by the first controller,
a second memory holding a controller identifier identifying the first controller, and
a processor for administering the reception and transmission of signals and being adapted to store one or more device identifiers in the first memory, providing a plurality of devices to be controlled by the first controller, each device comprising:
a radio frequency receiver for receiving signals,
a radio frequency transmitter for transmitting signals,
a processor for administering the reception and transmission of signals,
a first memory adapted to hold a device identifier identifying the device, and
a processor for administering the reception and transmission of signals and being adapted to provide an output to, or receive an input from, an appliance operationally connected to the device, wherein one or more of the devices are adapted to act as I/O devices in that the processors of each of said one or more devices comprises means for generating an event signal in response to input received from an appliance or user, the event signal comprising one or more destination identifiers corresponding to controller or device identifiers of one or more destination controllers or destination devices, generating a first signal comprising one or more destination identifiers corresponding to identifiers of one or more destination devices or destination controllers, information related to the operation of an appliance connected to a device, and one or more repeater identifiers corresponding to one or more signal repeating devices, transmitting said first signal, receiving the first signal at one of said plurality of devices, if one of the one or more destination identifiers corresponds to the device identifier of the receiving device, then processing said information in the processor of the device, and if one of the one or more repeater identifiers correspond to the device identifier of the receiving device, then transmitting a second signal holding at least said one or more destination identifiers and said information.

15. A method according to claim 14, wherein the first signal is transmitted by the first controller, the one or more destination identifiers comprised in the first signal is a device identifier, and the information comprised in the first signal comprises instructions to a processor of the destination device to provide an output to, or receive an input from, the appliance connected to the destination device.

16. A method according to claim 15, further comprising the step of receiving input from an appliance or user at the one or more I/O devices and generating an event signal in response to the received input.

17. A method according to claim 14, wherein the first signal is transmitted by a device and wherein the destination identifier comprised in the first signal is a controller identifier and wherein the information held by the first signal is related to a state or a reading of the device transmitting the first signal.

18. A method according to claim 14, further comprising the step of building a routing table indicating, for each device, other devices which can receive and process a signal transmitted by said device, and storing the routing table in the first memory of the first controller.

19. A method according to claim 18, further comprising the steps of identifying device identifiers in the routing table of devices for repeating a first signal having a predetermined destination identifier, and including said device identifiers as repeater identifiers in the first signal.

20. A method according to claim 14, further comprising tho step of, upon receiving a first or a second signal at a device, generate and transmit an acknowledgement signal having the identifier of the device or controller transmitting the first or second signal as destination identifier.

21. A method according to claim 20, wherein the acknowledgement signal comprises a destination identifier and one or more repeater identifiers, the method further comprising the steps of receiving said acknowledgement signal at a device and if one of the one or more repeater identifiers correspond to the device identifier of the receiving device, then transmitting a signal holding said destination identifiers and the acknowledgement.

* * * * *

UNITED STATES PATENT AND TRADEMARK OFFICE
CERTIFICATE OF CORRECTION

PATENT NO.    : 6,856,236 B2
DATED         : February 15, 2005
INVENTOR(S)   : Carlos Melia Christensen and Jesper Knudsen It is certified that error appears in the above-identified patent and that said Letters Patent is hereby corrected as shown below:

Title page,
Item [73], Assignees, please change "Ensys A/S" to -- Zensys A/S --.

Signed and Sealed this

Thirty-first Day of May, 2005

JON W. DUDAS
*Director of the United States Patent and Trademark Office*